US011948569B2

(12) United States Patent
Choi

(10) Patent No.: US 11,948,569 B2
(45) Date of Patent: Apr. 2, 2024

(54) ELECTRONIC APPARATUS AND CONTROLLING METHOD THEREOF

(71) Applicant: SAMSUNG ELECTRONICS CO., LTD., Suwon-si (KR)

(72) Inventor: Chanhee Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 179 days.

(21) Appl. No.: 17/510,960

(22) Filed: Oct. 26, 2021

(65) Prior Publication Data

US 2023/0005477 A1  Jan. 5, 2023

Related U.S. Application Data

(63) Continuation of application No. PCT/KR2021/014163, filed on Oct. 14, 2021.

(30) Foreign Application Priority Data

Jul. 5, 2021 (KR) .................. 10-2021-0087688

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 25/84* (2013.01); *H04R 1/406* (2013.01);
(Continued)

(58) Field of Classification Search
CPC .............. G10L 15/22; G10L 2015/088; G10L 2015/223; G10L 15/26; G10L 25/48
See application file for complete search history.

(56) References Cited

U.S. PATENT DOCUMENTS 9,484,030 B1 * 11/2016 Meaney ................. H04R 3/005
9,812,125 B2   11/2017 Lee et al.
(Continued)

FOREIGN PATENT DOCUMENTS

CN    110556107    12/2019
JP    6759058      9/2020
(Continued)

OTHER PUBLICATIONS

Search Report and Written Opinion dated Mar. 24, 2022 in counterpart International Patent Application No. PCT/KR2021/014163.

*Primary Examiner* — Mark Villena
(74) *Attorney, Agent, or Firm* — Nixon & Vanderhye P.C.

(57) ABSTRACT

An electronic apparatus includes: a memory storing a first threshold value and a second threshold value corresponding to a receiving direction of a wake-up word, a sound receiver comprising sound receiving circuitry, and a processor configured to: identify a receiving direction of the sound based on a sound received through the sound receiver, based on a similarity between sound data obtained in response to the received sound and the wake-up word being greater than or equal to the first threshold value corresponding to the identified receiving direction, perform voice recognition for a subsequent sound received through the sound receiver, and based on the similarity being less than the first threshold value and greater than or equal to the second threshold value, change the first threshold value.

14 Claims, 33 Drawing Sheets

(51) Int. Cl.
*G10L 25/84* (2013.01)
*H04R 1/40* (2006.01)
*H04R 3/00* (2006.01)

(52) U.S. Cl.
CPC ........ *H04R 3/005* (2013.01); *G10L 2015/088* (2013.01)

(56) References Cited

U.S. PATENT DOCUMENTS

| | | | |
|---|---|---|---|
| 9,940,949 B1* | 4/2018 | Vitaladevuni | G10L 25/78 |
| 10,134,425 B1* | 11/2018 | Johnson, Jr. | G10L 15/05 |
| 10,553,219 B2 | 2/2020 | Jung | |
| 10,762,897 B2 | 9/2020 | Yoo et al. | |
| 10,984,790 B2 | 4/2021 | Lim et al. | |
| 11,265,414 B2 | 3/2022 | Wang et al. | |
| 11,277,685 B1* | 3/2022 | Ayrapetian | G10L 21/02 |
| 2010/0070274 A1 | 3/2010 | Cho et al. | |
| 2017/0084278 A1 | 3/2017 | Jung | |
| 2018/0047390 A1 | 2/2018 | Yoo et al. | |
| 2019/0164552 A1 | 5/2019 | Lim et al. | |
| 2019/0392858 A1 | 12/2019 | Lee | |
| 2020/0220967 A1 | 7/2020 | Wang et al. | |
| 2020/0273451 A1 | 8/2020 | Kim et al. | |
| 2022/0068268 A1* | 3/2022 | Kracun | G10L 15/065 |
| 2022/0130375 A1* | 4/2022 | Miller | G10L 15/02 |
| 2022/0300001 A1* | 9/2022 | Gayaka | G06T 7/74 |
| 2022/0310094 A1* | 9/2022 | Nguyen | G10L 15/16 |

FOREIGN PATENT DOCUMENTS

| | | |
|---|---|---|
| KR | 10-1178801 | 8/2012 |
| KR | 10-1598948 | 3/2016 |
| KR | 10-2017-0035602 | 3/2017 |
| KR | 10-2018-0018146 | 2/2018 |
| KR | 10-1970346 | 4/2019 |
| KR | 10-2019-0064270 | 6/2019 |
| KR | 10-2019-0101329 A | 8/2019 |
| KR | 10-2114365 | 5/2020 |
| KR | 10-2020-0085220 | 7/2020 |
| KR | 10-2020-0104773 A | 9/2020 |
| KR | 10-2021-0078682 | 6/2021 |

* cited by examiner

FIG. 8

| WAKE-UP WORD SIMILARITY | | |
|---|---|---|
| RECEIVING DIRECTION | FIRST THRESHOLD VALUE | SECOND THRESHOLD VALUE |
| r1 | 20 | 10 |
| r2 | 20 | 10 |
| r3 | 20 | 10 |
| r4 | 30 | 10 |
| r5 | 30 | 10 |
| ... | | |
| rn-1 | 20 | 10 |
| rn | 35 | 10 |

805

ELECTRONIC APPARATUS AND CONTROLLING METHOD THEREOF

CROSS-REFERENCE TO RELATED APPLICATIONS

This application is a continuation of International Application No. PCT/KR2021/014163 designating the United States, filed on Oct. 14, 2021, in the Korean Intellectual Property Receiving Office and claiming priority to Korean Patent Application No. 10-2021-0087688, filed on Jul. 5, 2021, in the Korean Intellectual Property Office, the disclosures of which are incorporated by reference herein in their entireties.

BACKGROUND

Field

This disclosure relates to an electronic apparatus and a controlling method thereof, and for example, to an electronic apparatus for recognizing a wake-up word and performing voice recognition, and a controlling method thereof.

Description of Related Art

A voice recognition function may be started through a wake-up word. The wake-up word corresponds to a voice (or speech) recognition start command How the wake-up word, which is a designated keyword, corresponds to the user's utterance may be determined using a wake-up word recognition engine or the like. If a probability value for whether the wake-up word and the user utterance match is greater than or equal to a threshold value, voice recognition may be started based on the user utterance. An operation of starting voice recognition may be an operation of starting an application related to voice recognition.

For a threshold value which is a reference of whether the wake-up word is recognized, a single threshold value may be used and the single threshold value may be changed according to environments. In a quiet environment, a relatively low threshold value may be set to increase a recognition success rate, and in a noisy environment, a high threshold value may be set to reduce a misrecognition rate. However, when using a single threshold, it is difficult to adapt to a changed environment and a user may have difficulties in using voice recognition. For example, when a device for generating continuous noise in a fixed position, such as a radio, a speaker, or the like, is located around a microphone, the possibility of misrecognition may increase, and if a high threshold value is applied to prevent and/or reduce the misrecognition, voice recognition may be difficult to be used.

When a single threshold is changed collectively, the recognition rate of the wake-up word may be deteriorated. If a high threshold value is set in a noisy environment to reduce misrecognition rate, a noise source generating noise may be fixed at a specific location. However, if a single threshold is changed without considering a specific location, the misrecognition rate may become low, but a user has to make a loud and accurate utterance, and thus the user may feel inconvenience in using a voice recognition function.

SUMMARY

The disclosure relates to an electronic apparatus and a controlling method thereof, which are designed to improve the above-mentioned problem, and embodiments of the disclosure provide an electronic apparatus for identifying a receiving direction of a sound among a plurality of directions and changing a threshold value corresponding to the identified receiving direction on the basis of similarity between a user utterance and a wake-up word, and a controlling method thereof.

According to an example embodiment, an electronic apparatus includes: a memory storing a first threshold value and a second threshold value corresponding to a receiving direction of a wake-up word, a sound receiver including sound receiving circuitry, and a processor configured to: identify a receiving direction of the sound based on a sound received through the sound receiver, based on a similarity between sound data obtained in response to the received sound and the wake-up word being greater than or equal to the first threshold value corresponding to the identified receiving direction, perform voice recognition for a subsequent sound received through the sound receiver, and based on the similarity being less than the first threshold value and greater than or equal to the second threshold value, change the first threshold value.

The processor may, based on a number of reception of the sound having the similarity being less than the first threshold value and greater than or equal to the second threshold value being greater than or equal to a threshold number, be configured to change the first threshold value.

The processor may, based on the similarity being less than the first threshold value and greater than or equal to the second threshold value, be configured to change the first threshold value to increase by a preset ratio.

The memory may store a first threshold value and a second threshold value corresponding to each of a first receiving direction and a second receiving direction, and the processor may, based on the identified receiving direction being the first receiving direction, be configured to change a first threshold value corresponding to the first receiving direction and maintain a first threshold value corresponding to the second receiving direction.

The processor may, based on the received sound including voice data, be configured to: identify the receiving direction of the sound and obtain a similarity between the received sound and the wake-up word.

The first threshold value may be a similarity to identify whether the sound is the wake-up word, and the second threshold value may be a similarity to identify whether the sound is a particular noise source.

The processor may, based on sound not being received in the identified receiving direction for a threshold time or more, be configured to restore the changed first threshold value to the first threshold value before changing.

The processor may, based on the similarity being less than the first threshold value and greater than or equal to the second threshold value, be configured to: provide guide information for wake-up recognition, the guide information may include at least one of information indicating that the wake-up word has not been recognized, information of detecting a noise source, information for requesting removal of the noise source, recommendation location information of the electronic apparatus, or information requesting to change the location of the electronic apparatus.

The processor may, based on the number of reception of the sound having the similarity being less than the first threshold value and greater than or equal to the second threshold value being greater than or equal to the first threshold time, be configured to: provide the guide information, and based on the number of reception being less than the first threshold time and greater than or equal to the second threshold time, change the first threshold value.

The sound receiver may include at least two microphones, and the processor may be configured to identify a receiving direction of the sound based on a phase difference of the sound received by the at least two microphones.

A method of controlling an electronic apparatus storing a first threshold value and a second threshold value corresponding to a receiving direction of a wake-up word according to an example embodiment may include: based on a similarity between sound data obtained in response to a received sound and the wake-up word being greater than or equal to the first threshold value corresponding to the identified receiving direction, performing voice recognition for a subsequent sound; and based on the similarity being less than the first threshold value and greater than or equal to the second threshold value, changing the first threshold value.

The changing the first threshold value may include, based on a number of reception of the sound having the similarity being less than the first threshold value and greater than or equal to the second threshold value being greater than or equal to a threshold number, changing the first threshold value.

The changing the first threshold value may include, based on the similarity being less than the first threshold value and greater than or equal to the second threshold value, changing the first threshold value to increase by a preset ratio.

The electronic apparatus may store a first threshold value and a second threshold value corresponding to each of a first receiving direction and a second receiving direction, and the changing the first threshold value may include, based on the identified receiving direction being the first receiving direction, changing a first threshold value corresponding to the first receiving direction and maintaining a first threshold value corresponding to the second receiving direction.

The method may further include, based on the received sound including voice data, identifying the receiving direction of the sound and obtaining a similarity between the received sound and the wake-up word.

The first threshold value may be a similarity to identify whether the sound is the wake-up word, and the second threshold value may be a similarity to identify whether the sound is a particular noise source.

The method may further include, based on sound not being received in the identified receiving direction for a threshold time or more, restoring the changed first threshold value to the first threshold value before changing.

The method may include, based on the similarity being less than the first threshold value and greater than or equal to the second threshold value, providing guide information for wake-up recognition, and the guide information may include at least one of information indicating that the wake-up word has not been recognized, information of detecting a noise source, information for requesting removal of the noise source, recommendation location information of the electronic apparatus, or information requesting to change the location of the electronic apparatus.

The providing the guide information may include, based on the number of reception of the sound having the similarity being less than the first threshold value and greater than or equal to the second threshold value being greater than or equal to the first threshold time, provide the guide information, and based on the number of reception being less than the first threshold time and greater than or equal to the second threshold time, changing the first threshold value.

The identifying the receiving direction of the sound may include identifying a receiving direction of the sound based on a phase difference of the sound received by the at least two microphones.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8 is a table illustrating a first threshold value and a second threshold value corresponding to each of a plurality of reception directions according to various embodiments;

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be arbitrarily selected, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through an intervening third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic apparatus or an artificial intelligence electronic apparatus using an electronic apparatus (e.g., artificial intelligence electronic apparatus).

Hereinafter, various example embodiments of the disclosure will be described in greater detail.

Figure 1:
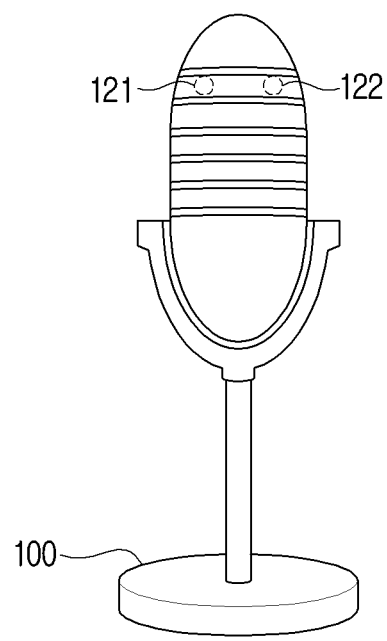
FIG. 1 is a diagram illustrating an electronic apparatus according to various embodiments.

FIG. 1 is a diagram illustrating an electronic apparatus 100 according to various embodiments.

Referring to FIG. 1, the electronic apparatus 100 may include a first microphone 121 and a second microphone 122. The electronic apparatus 100 may be a stand-type sound receiving device including a plurality of microphones.

Figure 2:
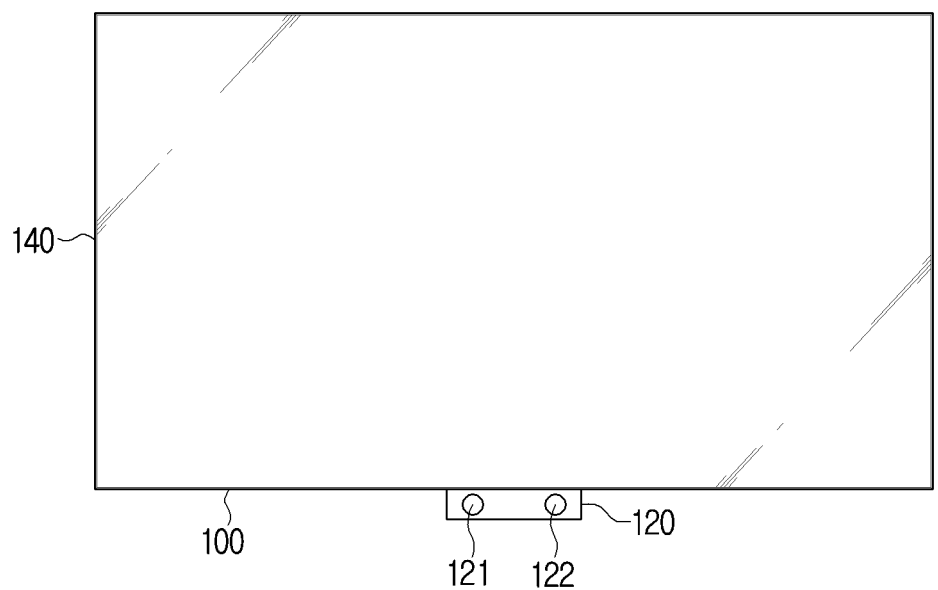
FIG. 2 is a diagram illustrating an electronic apparatus according to various embodiments.

FIG. 2 is a diagram illustrating the electronic apparatus 100 according to various embodiments.

Referring to FIG. 2, the electronic apparatus 100 may include a sound receiver 120 and a display 140. The sound receiver 120 may include the first microphone 121 and the second microphone 122. For example, the electronic apparatus 100 may be an apparatus that includes a TV, a monitor, a smartphone, a tablet, and the like.

Figure 3:
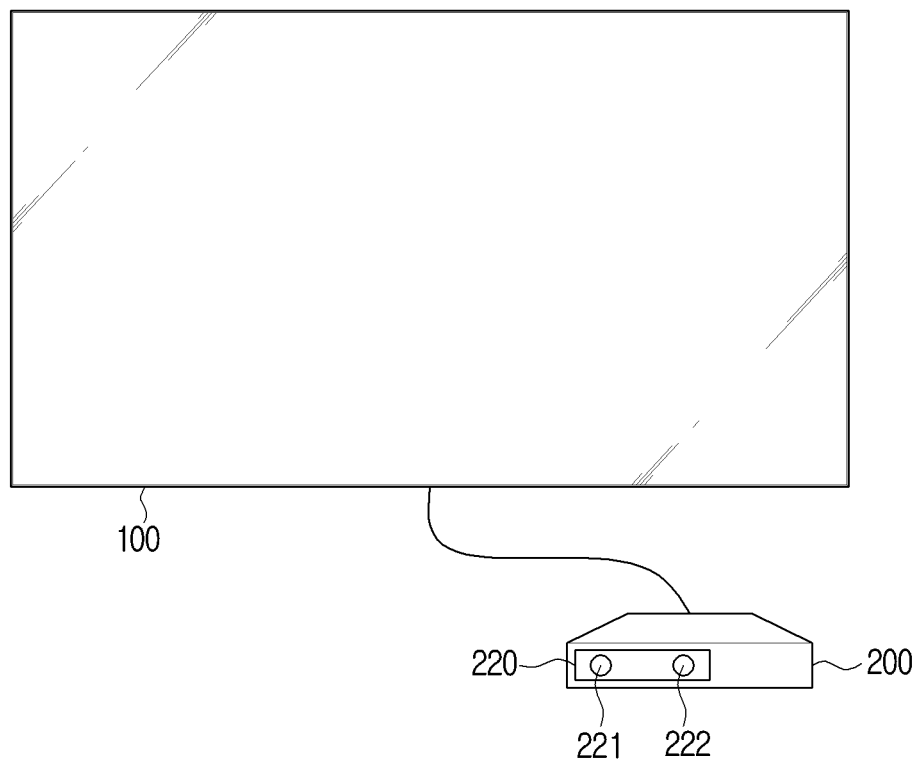
FIG. 3 is a diagram illustrating an electronic apparatus according to various embodiments.

FIG. 3 is a diagram illustrating the electronic apparatus 100 according to various embodiments.

Referring to FIG. 3, the electronic apparatus 100 may be connected to an external device 200. The external device 200 may be a set-top box or a sound bar. The electronic apparatus 100 may communicate with the external device 200 in a wireless or wired manner. The external device 200 may include a sound receiver 220, and the sound receiver 220 may include a first microphone 221 and a second microphone 222. The external device 200 may receive sound and convert the sound into a digital signal. The external device 200 may transmit the converted sound data to the electronic apparatus 100.

Figure 4:
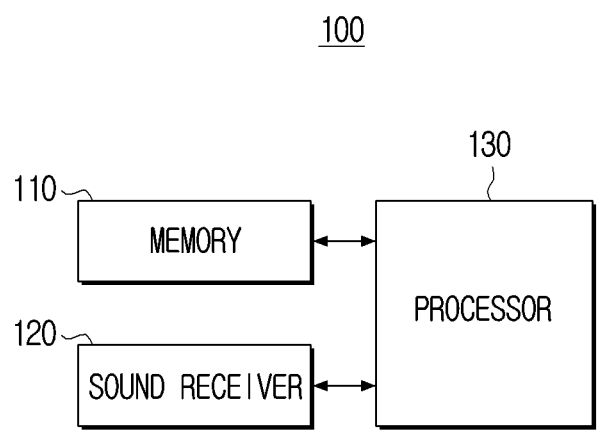
FIG. 4 is a block diagram illustrating an example configuration of an electronic apparatus according to various embodiments.

FIG. 4 is a block diagram illustrating the electronic apparatus 100 according to various embodiments.

Referring to FIG. 4, the electronic apparatus 100 may include at least one of a memory 110, a sound receiver (e.g., including sound receiving circuitry) 120, and/or the processor (e.g., including processing circuitry) 130.

The electronic apparatus 100 according to various embodiments may include, for example, at least one of a smartphone, a tablet personal computer (PC), a mobile phone, a desktop PC, a laptop PC, a personal digital assistant (PDA), a portable multimedia player (PMP), etc. In some embodiments, the electronic apparatus 100 may include at least one of, for example, a television, a digital video disk (DVD) player, a media box (for example, SAMSUNG HOMESYNC™, APPLE TV™, or GOOGLE TV™), or the like.

The memory 110 may be implemented as an internal memory such as a read-only memory (ROM), such as electrically erasable programmable read-only memory (EE-PROM), and a random-access memory (RAM) or a memory separate from the processor 130. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

The memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the electronic apparatus 100, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

The memory 110 may store a first threshold value and a second threshold value corresponding to a receiving direction of a wake-up word.

The sound receiver 120 may include various sound receiving circuitry and receive sound through at least one microphone. The sound received by the sound receiver 120 may be an analog signal.

The processor 130 may include various processing circuitry and perform the overall control operation of the electronic apparatus 100. Specifically, the processor 130 functions to control the overall operation of the electronic apparatus 100.

The processor 130 may be implemented with, for example, and without limitation, at least one of a digital signal processor (DSP), a microprocessor, a time controller (TCON), or the like. The processor 130 is not limited thereto and may include, for example, and without limitation, at least one or more of a central processing unit, a dedicated processor, a (CPU), a micro controller unit (MCU), a micro processing unit, a controller, an application processor (AP), a communication processor (CP), an advanced reduced instruction set computing (RISC) machine (ARM) processor, or the like, or may be defined as a corresponding term. The processor 130 may be implemented in a system on chip (SoC) type or a large scale integration (LSI) type in which a processing algorithm is built therein or in a field programmable gate array (FPGA) type. The processor 130 may perform various functions by executing computer executable instructions stored in a memory 110.

The processor 130 may identify the direction of reception of the sound based on the sound received through the sound receiver 120, perform voice recognition on the subsequent sound received through the sound receiver 120 if the similarity between the sound data obtained in response to the received sound and the wake-up word is greater than or equal to a first threshold value corresponding to the identified receiving direction, and change the first threshold value if the similarity is less than the first threshold value and is greater than the second threshold value.

The processor 130 may obtain sound through the sound receiver 120. The sound may be an analog signal. The processor 130 may convert the sound of the digital signal into text data. The converted sound may be written as sound data.

The processor 130 may convert the sound of the digital signal into text data. The converted text data may be written into text data corresponding to sound, text data corresponding to sound data, or sound data.

Accordingly, the sound data may refer to at least one of the data converted into a digital signal or data converted into text data.

The processor 130 may obtain similarity between sound data (e.g., text data corresponding to the received sound) and the wake-up word. The similarity may be a value for determining that text data corresponding to the sound and text data corresponding to the wake-up word are similar pronunciation.

If the similarity is greater than or equal to the first threshold, the processor 130 may identify that sound matches the wake-up word. Accordingly, the processor 130 may perform a function corresponding to voice recognition. The processor 130 may execute a voice recognition-related application, and perform voice recognition on a subsequent sound received through the sound receiver 120.

If the similarity is less than the first threshold value and greater than or equal to the second threshold value, the first threshold value may change.

The first threshold may be a reference value for determining whether to recognize the wake-up word, and the second threshold may be a reference value for distinguishing a specific noise. If the similarity is greater than the first threshold value, the processor 130 may determine that the sound is the same as the wake-up word and perform a function corresponding to the voice recognition. If the similarity is less than the first threshold value, the processor 130 may determine that the sound is not the same as the wake-up word, and may not perform a function corresponding to the voice recognition.

It is possible to additionally determine whether the similarity is greater than or equal to the second threshold in the condition that the similarity is less than the first threshold value. The second threshold may be a threshold value for distinguishing target noise expected to affect the recognition rate of the wake-up word.

Figure 14:
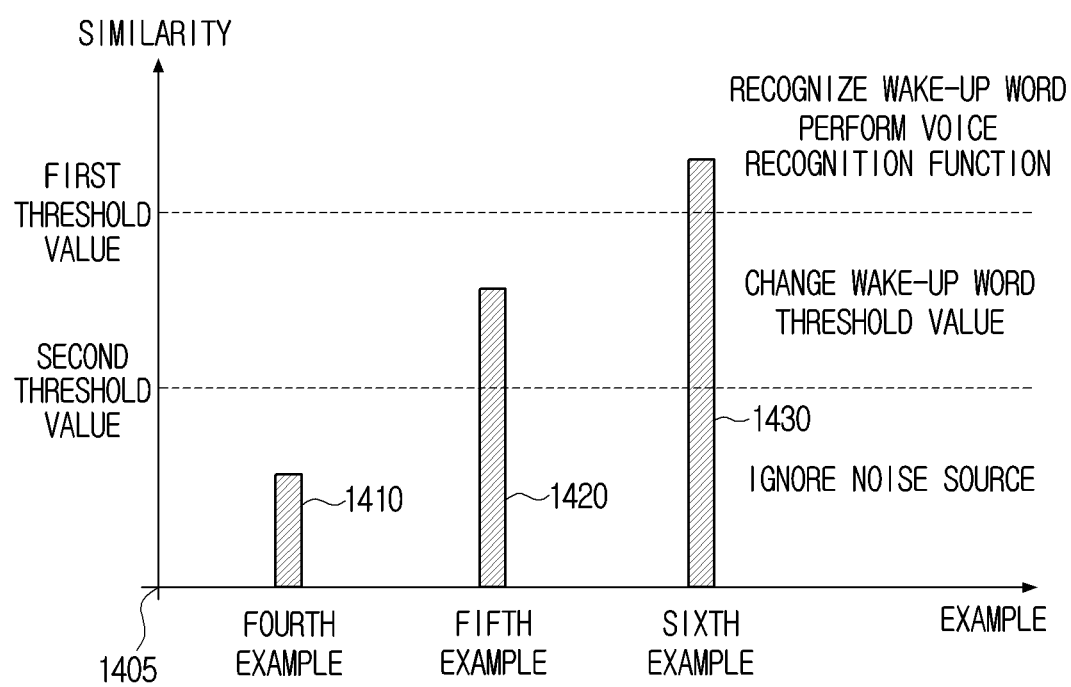
FIG. 14 is a graph illustrating example operation performed based on similarity according to various embodiments.

The target noise may refer, for example, to noise that interferes with the recognition of the wake-up word. For example, the target noise may refer, for example, to a human voice, a human conversation, a music sound, or the like. If it is possible to interfere with the recognition of the wake-up word, it should be similar enough to be confused with the wake-up word. The possibility that the machine sound or life noise is recognized as a wake-up word may be very low. Therefore, a sound having a low degree of similarity to be determined not to be a target noise does not need to perform a first threshold change operation. Thus, there is a need for a second threshold for this determination. If the similarity is greater than or equal to the second threshold, the processor 130 may determine that there is a need to change the first threshold. If the similarity is less than the second threshold, the processor 130 may ignore the corresponding sound. The detailed description related thereto is illustrated in FIG. 14.

The processor 130 may change the first threshold value if the similarity is less than the first threshold and the number of times of the reception of the sound that is greater than or equal to the second threshold is greater than or equal to the threshold number.

The processor 130 may repeatedly receive sound. The processor 130 may receive the sound during a predetermined time (or period) and calculate the number of times of reception of the sound corresponding to the receiving direction. For example, the processor 130 may accumulate the reception frequency of the sound for each receiving direction. For example, the processor 130 may store the information that the sound is received by three times in the fourth direction for one minute, and the sound has been received once in the first direction. Whenever a sound is received, the processor 130 may accumulate and store the reception times for each receiving direction whenever the sound is received.

In accumulating the number of reception, the processor 130 may check whether the sound is the same. The processor 130 may calculate the number of times received for each receiving direction with respect to the same sound. For example, sounds were received by three times in the first receiving direction, where sounds of two times may be the same but the sound of one time may be different. In this case, the cumulative value of the number of times the processor 130 accumulates may be two times, because if sounds are totally different, the importance of the number of reception times is low. When different sounds are recognized in the same receiving direction, the processor 130 may store the number of times that the number of times of reception is higher in the memory 110.

The reception times may be recited as the cumulative reception times. A description of the reception times and threshold times will be described in greater detail below with reference to FIG. 15.

The processor 130 may change the first threshold value to be increased by a predetermined ratio if the similarity is less than the first threshold and is greater than or equal to the second threshold.

The processor 130 may change the first threshold according to a predetermined scheme. The predetermined scheme may be a method of changing the first threshold to a predetermined ratio (e.g., 150%). For example, if the first threshold for the first receiving direction is 20, the processor 130 may change the first threshold 20 to 30 based on the similarity. The processor 130 may change the first threshold value to be increased. The operation of increasing the first threshold may refer, for example, to the wake-up word being pronounced to be more accurate and louder. If it is determined that the wake-up word is not well recognized due to the current noise, it is possible to prevent and/or reduce a situation where the wake-up word is misrecognized by increasing the first threshold value. If the first threshold is increased, the user must utter the wake-up word with a greater and accurate pronunciation relative to the ambient noise. Further description related to the increase in the first threshold will be described in FIG. 15.

The memory 110 of the electronic apparatus 100 may store a first threshold value and a second threshold value corresponding to each of the first receiving direction and the second receiving direction. If the identified receiving direction is the first receiving direction, the processor 130 may change the first threshold value corresponding to the first receiving direction and maintain a first threshold value corresponding to the second receiving direction.

The electronic apparatus 100 may divide the receiving direction of the sound into a predetermined number. For example, assume that the receiving direction is divided in two receiving directions. The divided receiving direction is assumed to be a first receiving direction and a second receiving direction. A first threshold value and a second threshold value corresponding to each of the first receiving direction and the second receiving direction may be predetermined. For example, there may be a first threshold value corresponding to the first receiving direction, and a second threshold value corresponding to the first receiving direction. Also, there may be a first threshold value corresponding to the second receiving direction and a second threshold value corresponding to the second receiving direction. The first threshold value may refer to a threshold value of the first type, and the second threshold value may refer to a threshold value of the second type.

A first threshold and a second threshold corresponding to each of the plurality of receiving directions may be present, and the description related thereto is described in greater detail below with reference to FIG. 8.

The processor 130 may identify the direction of reception of sound. It is assumed that the direction of reception of the sound in the plurality of receiving directions is the first receiving direction. The processor 130 may change only the first threshold value corresponding to the first receiving direction and maintain the first threshold value corresponding to the second receiving direction without changing. As a result, since only the threshold value associated with the identified direction of the noise source (sound) is changed, the recognition rate of the wake-up word recognized in the direction in which the noise source (sound) is identified needs to be interpreted more strictly.

The processor 130 may identify a receiving direction of the sound and obtain similarity between the received sound and the wake-up word if the received sound includes voice data.

The processor 130 may determine whether the received sound is a voice or a non-voice. The voice may be a sound that includes the utterance of a person, and the non-voice may refer, for example, to sound that does not include the person's utterance. For example, voice may be a human voice, a human conversation, a music sound including a human voice, and the like. The un-voice may be a mechanical sound, a wind sound, a water sound, a life noise, and the like.

The processor 130 may identify a direction of reception of the sound when the sound includes a voice, and may obtain a similarity when the sound includes a voice.

According to an embodiment, various embodiments may be implemented in the form of determining whether a sound is voice or not after identifying the direction of reception of the sound and obtaining a similarity. The description related thereto is described in greater detail below with reference to FIG. 18.

The first threshold may be similarity to identify whether the sound is a wake-up word, and the second threshold may be a similarity to identify whether the sound is a particular noise source.

If the similarity is greater than or equal to the first threshold, the processor 130 may identify that the sound is a wake-up word. If the similarity is less than the first threshold, the processor 130 may identify that the sound is not a wake-up word.

If the similarity is greater than or equal to the second threshold, the processor 130 may identify the sound as the target sound. If the similarity is less than the second threshold, the processor 130 may identify that sound is not a target noise. The target noise may refer, for example, to a noise that is determined to interfere with recognizing the wake-up word. Noise with low similarity may have low relevance with the wake-up word. Thus, noise having a low similarity does not affect the wake-up word recognition, so the processor 130 may ignore sound that is less than the second threshold.

More details of first threshold value and the second threshold value will be described in greater detail below with reference to FIG. 14.

The processor 130 may restore the changed first threshold value to the first threshold value before changing, if the sound is not received in the receiving direction identified by the threshold time or more.

The processor 130 may initialize the threshold if the sound is not received for a threshold time (or a predetermined time). The processor 130 may re-change (or restore) the changed first threshold to a value prior to the change. The processor 130 may not simply determine whether a sound has been received, but may determine whether a sound is not received in the identified receiving direction. For example, assuming that there is a noise source in the first receiving direction, it is assumed that the first threshold value corresponding to the first receiving direction has changed. If the sound is not received over a threshold time in the first receiving direction, the processor 130 may restore the changed first threshold value back to the first threshold before changing. Even if the sound is newly received in the second receiving direction during the threshold time, the operation of the processor 130 may not be changed, and the threshold value may be restored to the first threshold before changing.

If the similarity is less than the first threshold value and is greater than or equal to the second threshold value, the processor 130 may provide guide information for wake-up recognition, and the guide information may include at least one of information indicating that the wake-up word has not been recognized, information about detection of the noise source, information about the location of the noise source, information for requesting removal of the noise source, recommendation location information of the electronic apparatus 100, or information requesting to change the location of the electronic apparatus 100.

Operations related to the guide information will be described in greater detail below in S2040 of FIG. 20, S2340 of FIG. 23, and S2835 of FIG. 28. An example guide information providing screen will be described in greater detail below with reference to FIGS. 29-32.

Figure 29:
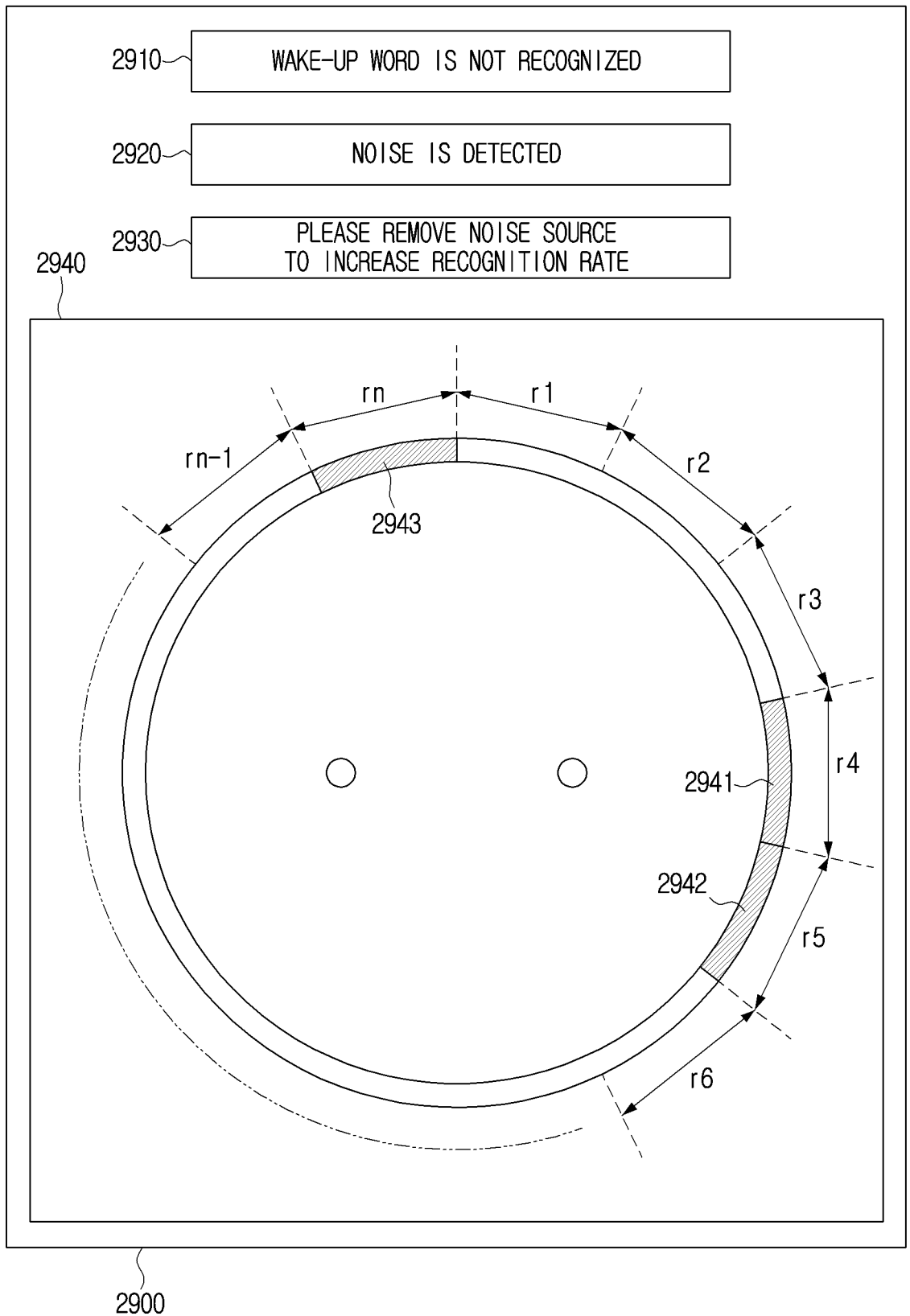
FIG. 29 is a diagram illustrating an example operation of providing guide information according to various embodiments.
Figure 30:
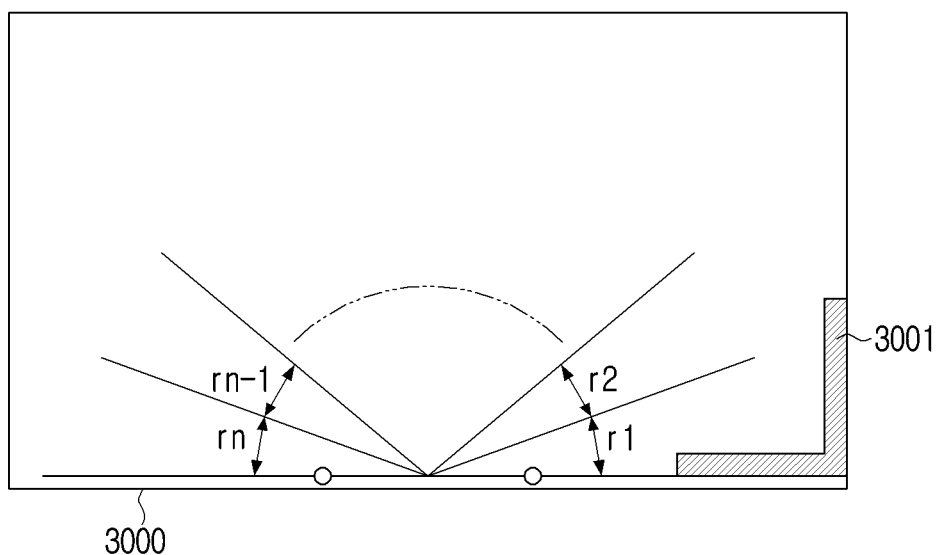
FIG. 30 is a diagram illustrating an example operation of providing guide information according to various embodiments.
Figure 31:
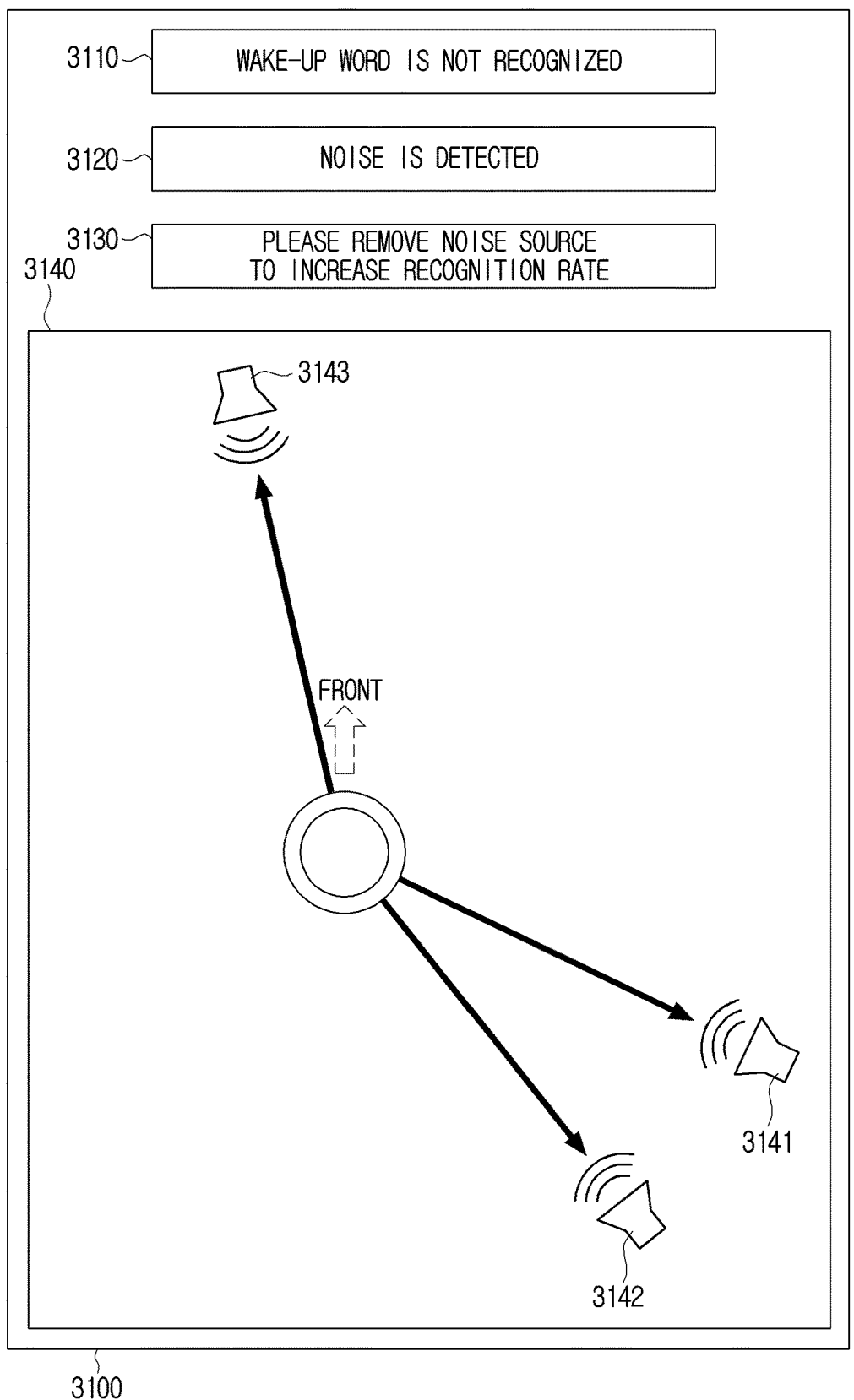
FIG. 31 is a diagram illustrating an example operation of providing guide information according to various embodiments.
Figure 32:
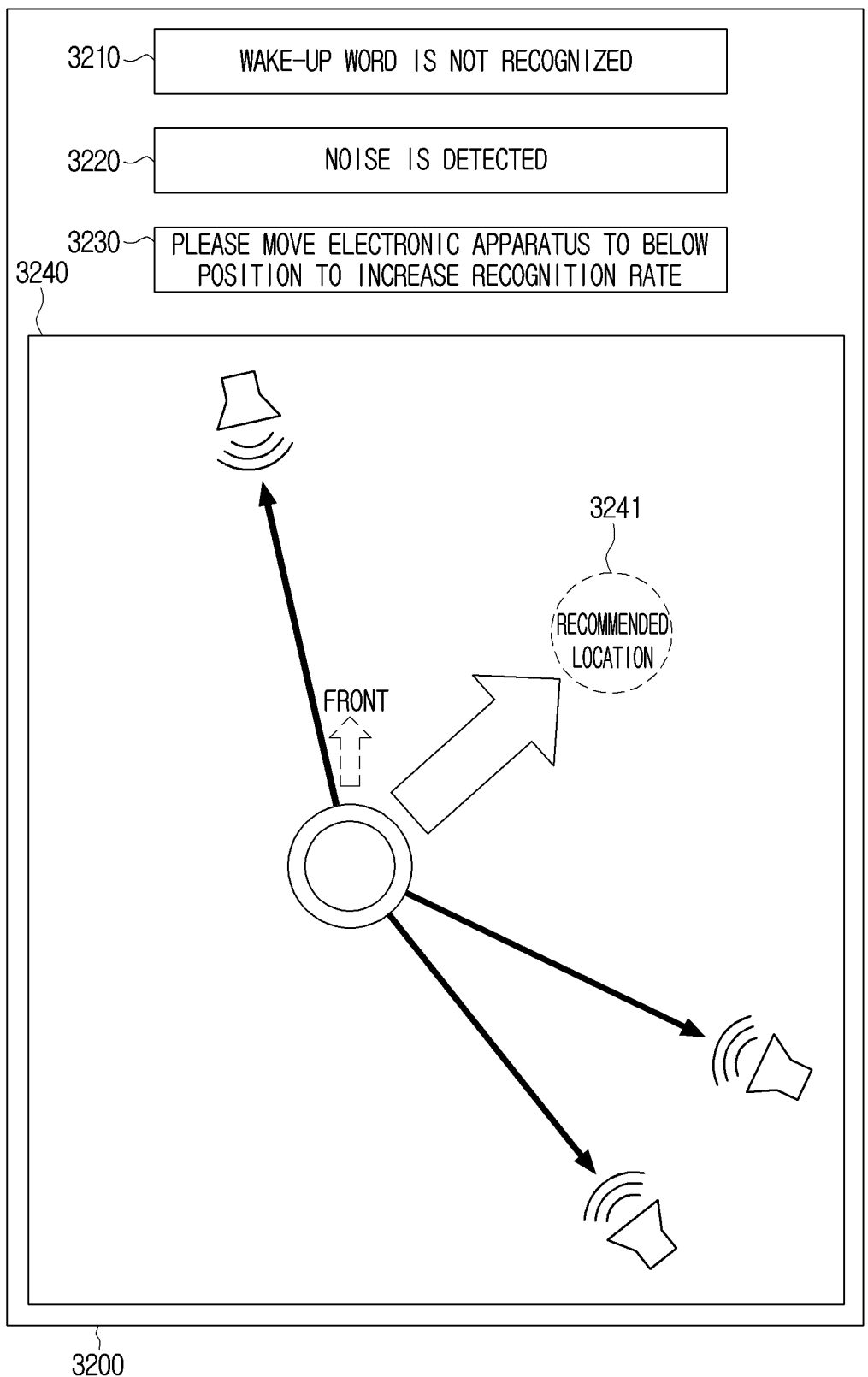
FIG. 32 is a diagram illustrating an example operation of providing guide information according to various embodiments.

The information indicating that the wake-up word has not been recognized may be included, for example, in a UI 2910 of FIG. 29, a UI 3110 of FIG. 31, or a UI 3210 of FIG. 32. The noise source detection information may be included, for example, in a UI 2920 of FIG. 29, a UI 3120 of FIG. 31, and a UI 3220 of FIG. 32. The location information of the noise source may be included, for example, in a UI 2940 of FIG. 29, an icon 3001 of FIG. 30, a UI 3140 of FIG. 31, or a UI 3240 of FIG. 32. The information for requesting removal of the noise source may be included, for example, in a UI 2930 of FIG. 29 or a UI 3130 of FIG. 30. The recommendation location information of the electronic apparatus 100 may be included, for example, in a UI 3240 of FIG. 32. The information requesting to change the position of the electronic apparatus 100 may be included, for example, in a UI 3230 of FIG. 32.

The processor 130 may generate guide information and provide the generated guide information to the user. For example, the processor 130 may display guide information generated through the display 140 included in the electronic apparatus 100. As another example, the processor 130 may output guide information generated through a speaker (not shown) included in the electronic apparatus 100. In an embodiment using a speaker, the graphical image may be converted into text and outputted. The UI or image that cannot be converted to text may be ignored. As another example, the processor 130 may output guide information generated through an external device. The processor 130 may transmit the generated guide information to an external device, and the external device may output the guide information through a display or a speaker.

The processor 130 may provide the guide information if the reception times of the sound of which similarity is less than the first threshold and greater than or equal to the second threshold value is greater than or equal to the first threshold number, and may change the first threshold value if the number of times of reception is less than the first threshold number and greater than or equal to the second threshold number.

An example related to the threshold number will be described in greater detail below with reference to FIG. 15.

The sound receiver unit 120 may include at least two microphones, and the processor 130 may identify the direction of reception of the sound based on the phase difference of the sound received from the at least two microphones.

According to an embodiment, the sound receiver 120 may include one microphone. The processor 130 may include a vibration sensor or an object detection sensor to identify the direction of reception of the sound. The processor 130 may identify a direction of reception of the sound based on sensing data received from the vibration sensor. The processor 130 may identify a location of an object that outputs sound based on sensing data received from the object detection sensor, and identify a direction of reception of the sound according to the identified location of the object.

According to an embodiment, the sound receiver 120 may include two microphones. When using two microphones, a phase difference for the same sound reaching the two microphones may be generated. The processor 130 may identify the direction of receipt of the sound based on the phase difference. In the case of determining a phase difference through two microphones, a direction corresponding to the same phase difference may be two. For example, a phase difference obtained in an embodiment in which a sound is output from the North direction may be the same as a phase difference obtained in an embodiment where a sound is output from the South direction. The processor 130 may make different placement heights of the two microphones. Therefore, even though the phase difference is the same, it is possible to identify the correct receiving direction using the difference between the data obtained in the first microphone and the data obtained by the second microphone.

According to an embodiment, the sound receiver 120 may include three or more microphones. Even if the arrangement height of the three or more microphones is the same, the case where the receiving directions are different even if the phase difference is the same will not occur. The processor 130 may use three or more microphones to identify the direction of reception of the correct sound.

The memory 110 may store a first threshold value and a second threshold value corresponding to each predetermined number of receiving directions. In addition, a first threshold value corresponding to each of the plurality of receiving directions may be separately controlled. Therefore, the first threshold value corresponding to some directions of the plurality of receiving directions may be changed and the first threshold value corresponding to the other direction may be maintained. Since the first threshold value recognizing the wake-up word is differently controlled according to the direction of the user utterance, noise other than the user utterance voice may be effectively considered for a wake-up word recognition operation. The wake-up word recognition rate in the direction in which the noise is heard may be controlled by changing the first threshold value.

Although a simplified configuration of the electronic apparatus 100 is shown in FIG. 125, various configurations may be additionally provided during implementation. An example be described in greater detail below with reference to FIG. 5.

Figure 5:
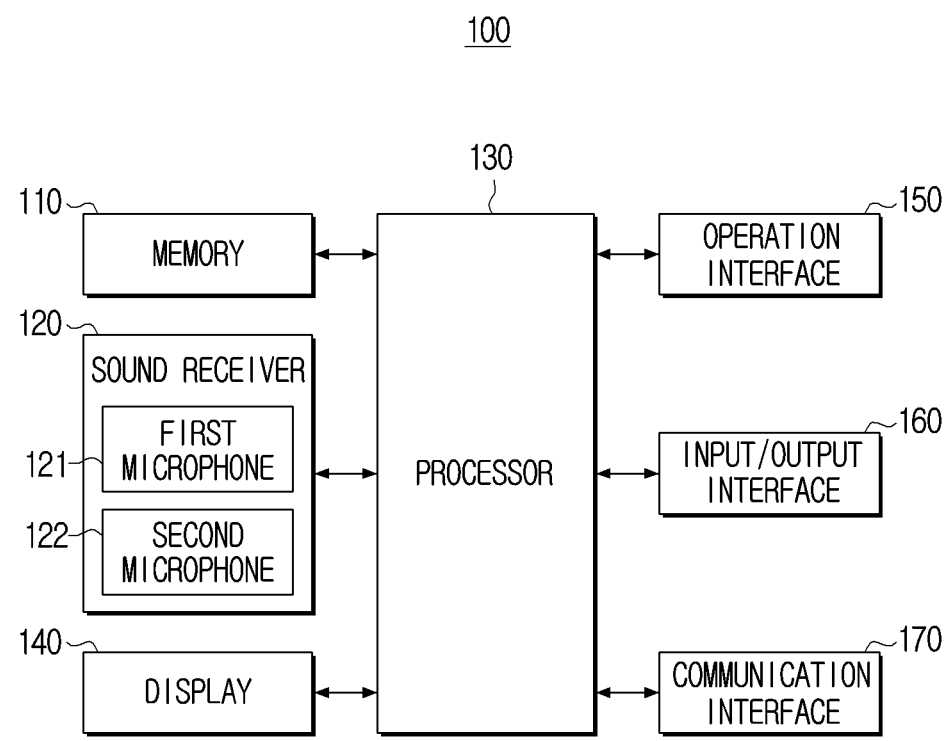
FIG. 5 is a block diagram illustrating an example configuration of the electronic apparatus of FIG. 4 according to various embodiments.

FIG. 5 is a block diagram illustrating an example configuration of the electronic apparatus 100 of FIG. 4 according to various embodiments.

Referring to FIG. 5, the electronic apparatus 100 may include at least one of a memory 110, a sound receiver (e.g., including at least one microphone) 120, a processor (e.g., including processing circuitry) 130, a display 140, an operation interface (e.g., including interface circuitry) 150, an input/output interface (e.g., including input/output circuitry) 160, and/or a communication interface (e.g., including communication circuitry) 170.

The same or similar operations as those described above among the operations of the memory 110, the sound receiver 120, and the processor 130 may not be repeated here.

The sound receiver 120 may include at least one of a first microphone 121 and/or a second microphone 122.

According to an embodiment, the electronic apparatus 100 may include a display 140. The electronic apparatus 100 may display the obtained image or content directly to the display 140.

In accordance with an embodiment, the electronic apparatus 100 may not include the display 140. The electronic apparatus 100 may be connected to an external display device and may transmit the image or content stored in the electronic apparatus 100 to the external display device. For example, the electronic apparatus 100 may transmit an image or content to an external display device along with a control signal for controlling the image or content to be displayed on the external display device. The external display device may be connected to the electronic apparatus 100 through the communication interface 170 or the input/output interface 160. For example, the electronic apparatus 100 may not include a display, such as a Set Top Box (STB). The electronic apparatus 100 may include only a small display capable of displaying only simple information such as text information. The electronic apparatus 100 may transmit the image or the content to the external display device by wire or wirelessly via the communication interface 170 or may transmit the image or the content to the external display device via the input/output interface 160.

The display 140 may be implemented as various types of panels such as, for example, and without limitation, a liquid crystal display (LCD) panel, organic light emitting diodes (OLED) display panel, a plasma display panel (PDP), and the like. In the display 140, a driving circuit of the display panel may be implemented using an a-Si thin film transistor (TFT), a low temperature poly silicon (LTPS) TFT, an organic TFT (OTFT), and a backlight. Further, the display 140 may be implemented as at least one of a touch screen coupled with a touch sensor, a flexible display, a three-dimensional (3D) display, or the like.

According to an embodiment, the display 140 may include not only a display panel to output an image but also a bezel that houses a display panel. In particular, the bezel according to an embodiment may include a touch sensor (not shown) for sensing a user interaction.

The operation interface 150 may include various interface circuitry and be implemented using a device such as at least one of a button, a touch pad, a mouse, a keyboard, or a touch screen capable of performing the above-described display function and operation input function. Here, the button may be various types of buttons such as at least one of a mechanical button, a touch pad, a wheel, or the like, formed in an arbitrary region such as at least one of a front portion, a side portion, a back portion, or the like, of the outer surface of the main body of the electronic apparatus 100.

The input and output interface 160 may include various input/output circuitry and include, for example, one or more of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like. The input and output interface 160 may input and output at least one of an audio signal and a video signal. According to an example, the input and output interface 160 may include a port to input and output only an audio signal or a port to input and output only a video signal as a separate port, or may be implemented as a port which input and output both the audio signal and the video signal.

The electronic apparatus 100 may transmit at least one of the audio and video signals to an external device (e.g., an external display device or an external speaker) via the input/output interface 160. An output port included in the input/output interface 160 may be connected to an external device, and the electronic apparatus 100 may transmit at least one of audio and video signals to an external device through the output port.

The communication interface 170 may include various communication circuitry to communicate with various types of external devices according to various types of communication methods. The communication interface 170 includes a Wi-Fi module, a Bluetooth module, an infrared ray communication module, a wireless communication module, or the like. The Wi-Fi module and the Bluetooth module may perform communication by the Wi-Fi method and Bluetooth method, respectively. The wireless communication module may include at least one chip performing communication according to various communication standards such as Zigbee, 3rd generation (3G), 3rd generation partnership project (3GPP), long term evolution (LTE), LTE advanced (LTE-A), 4th generation (4G), 5th generation (5G), or the like, in addition to the communication methods described above.

According to an embodiment, the communication interface 170 may use the same communication module (for example, Wi-Fi module) to communicate with an external device such as a remote controller and an external server.

In accordance with another example, the communication interface 170 may utilize different communication modules to communicate with an external device such as a remote controller and an external server. For example, the communication interface 170 may use at least one of an Ethernet module or a Wi-Fi module to communicate with an external server, and may use a bluetooth (BT) module to communicate with an external device such as a remote controller. However, this is merely an example, and the communication interface 170 may use at least one communication module among various communication modules when communicating with a plurality of external devices or an external server.

The electronic apparatus 100 may include various configurations for performing an operation corresponding to a user voice signal received through a microphone (not shown).

For example, the electronic apparatus 100 may control the display 140 based on a user voice signal received through a microphone (not shown). For example, when a user voice signal for displaying A content is received, the electronic apparatus 100 may control the display 140 to display the A content.

As another example, the electronic apparatus 100 may control an external display device connected to the electronic apparatus 100 based on a user voice signal received through a microphone (not shown). Specifically, the electronic apparatus 100 may generate a control signal for controlling the external display device so that an operation corresponding to the user voice signal is performed in the external display device, and transmit the generated control signal to the external display device. The electronic apparatus 100 may store a remote control application for controlling an external display device. The electronic apparatus 100 may transmit the generated control signal to the external display device using at least one of Bluetooth, Wi-Fi, or infrared rays. For example, when a user voice signal for displaying A content is received, the electronic apparatus 100 may transmit a control signal to the external display device to control the A content to be displayed on the external display device. The electronic apparatus 100 may refer to various terminal devices capable of installing a remote control application such as a smartphone, an AI speaker, or the like.

As another example, the electronic apparatus 100 may use a remote control device to control an external display device connected to the electronic apparatus 100 based on a user voice signal received via a microphone (not shown). The electronic apparatus 100 may transmit a control signal for controlling the external display device to the remote control device so that an operation corresponding to the user voice signal is performed in the external display device The remote control device may transmit a control signal received from the electronic apparatus 100 to an external display device. For example, when a user voice signal for displaying A content is received, the electronic apparatus 100 may transmit a control signal to the remote control device for controlling the A content to be displayed on the external display device, and the remote control device may transmit the received control signal to the external display device.

The electronic apparatus 100 may receive a voice signal from a microphone (not shown) included in the electronic apparatus 100 or a microphone (not shown) included in the remote control device. According to an embodiment, upon receiving an analog voice signal from a microphone (not shown) included in the electronic apparatus 100, the electronic apparatus 100 may convert the analog voice signal into a digital voice signal. According to an embodiment, when the remote control device receives an analog voice signal through a microphone (not shown) included in the remote control device, the remote control device may convert the analog voice signal into a digital voice signal. In addition, the remote control device may transmit the converted digital voice signal to the electronic apparatus 100.

The electronic apparatus 100 according to an embodiment may transmit a received digital voice signal to the voice recognition external server. The voice recognition external server may perform a speech to text (STT) function for converting a digital voice signal into text information. The voice recognition external server may perform the STT function to convert the digital voice signal into text information and search information corresponding to the converted text information. The voice recognition external server may transmit information corresponding to the converted text information to the electronic apparatus 100. The speech recognition external server may simultaneously perform the STT function and a search function.

In the voice recognition external server, only the STT function may be performed and the search function may be performed in a separate external server. In this case, the digital voice signal may be converted into text information by an external server that performs the STT function, and the converted text information may be transmitted to a separate external server performing a search function.

The electronic apparatus 100 according to an embodiment may perform a direct STT function. The electronic apparatus 100 may convert a digital voice signal into text information and transmit the converted text information to a voice recognition external server. In this case, the voice recognition external server may only perform a search function. The voice recognition external server may search information corresponding to the converted text information and transmit the searched information to the electronic apparatus 100.

With respect to the overall operation of voice recognition, the electronic apparatus 100 may perform all operations autonomously, or the electronic apparatus 100 and the external server may perform some operations separately.

According to an embodiment, the electronic apparatus 100 may perform operations related to receiving a voice signal (or sound) and operations related to voice recognition. The electronic apparatus 100 may store a voice engine and may perform a direct speech recognition operation based on the stored voice engine. The electronic apparatus 100 may perform a voice recognition operation corresponding to a received voice signal and a voice signal reception operation without using an external server.

According to an embodiment, the electronic apparatus 100 may perform an operation of receiving a voice signal and an operation of outputting a result of voice recognition, and the external server may perform an operation of receiving a voice signal from the electronic apparatus 100, an operation of generating a result of voice recognition, and an operation of transmitting the generated result of the voice recognition to the electronic apparatus 100. Here, the electronic apparatus 100 may obtain a voice signal. The electronic apparatus 100 may transmit the obtained voice signal to an external server. The external server may perform a voice recognition operation based on the voice signal received from the electronic apparatus 100 and may generate a result of speech recognition. The external server may transmit the result of the generated speech recognition to the electronic apparatus 100. The electronic apparatus 100 may output a result of voice recognition received from an external server. Here, the output operation may be output in the form of an image data through a display or the like, or may be output in the form of an audio data through a speaker or the like. According to an implementation, the output operation may be output together with the image data and the audio data.

In accordance with an embodiment, the electronic apparatus 100 may perform some of the overall operations of the speech recognition and the external device may perform the remaining operations during the overall operation of the speech recognition. For example, the electronic apparatus 100 may transmit an obtained voice signal to an external server when the wake-up word is recognized, and directly perform a predetermined operation without transmitting a voice signal to an external server if the wake-up word is not recognized.

The electronic apparatus 100 may receive a voice signal and identify a receiving direction of the received voice signal. The electronic apparatus 100 may obtain the similarity between the voice signal and the wake-up word. If the obtained similarity is greater than or equal to the first threshold, the electronic apparatus 100 may transmit the obtained voice signal to the external server. The external server may generate a voice recognition result based on the voice signal received from the electronic apparatus 100. The external server may transmit the result of the generated speech recognition to the electronic apparatus 100. The electronic apparatus 100 may output a result of voice recognition received from an external server. If the obtained similarity is less than the first threshold value, the electronic apparatus 100 may change the first threshold value corresponding to the receiving direction. An operation of the first threshold change will be described in greater detail below with reference to FIGS. 17 to 27.

Figure 6:
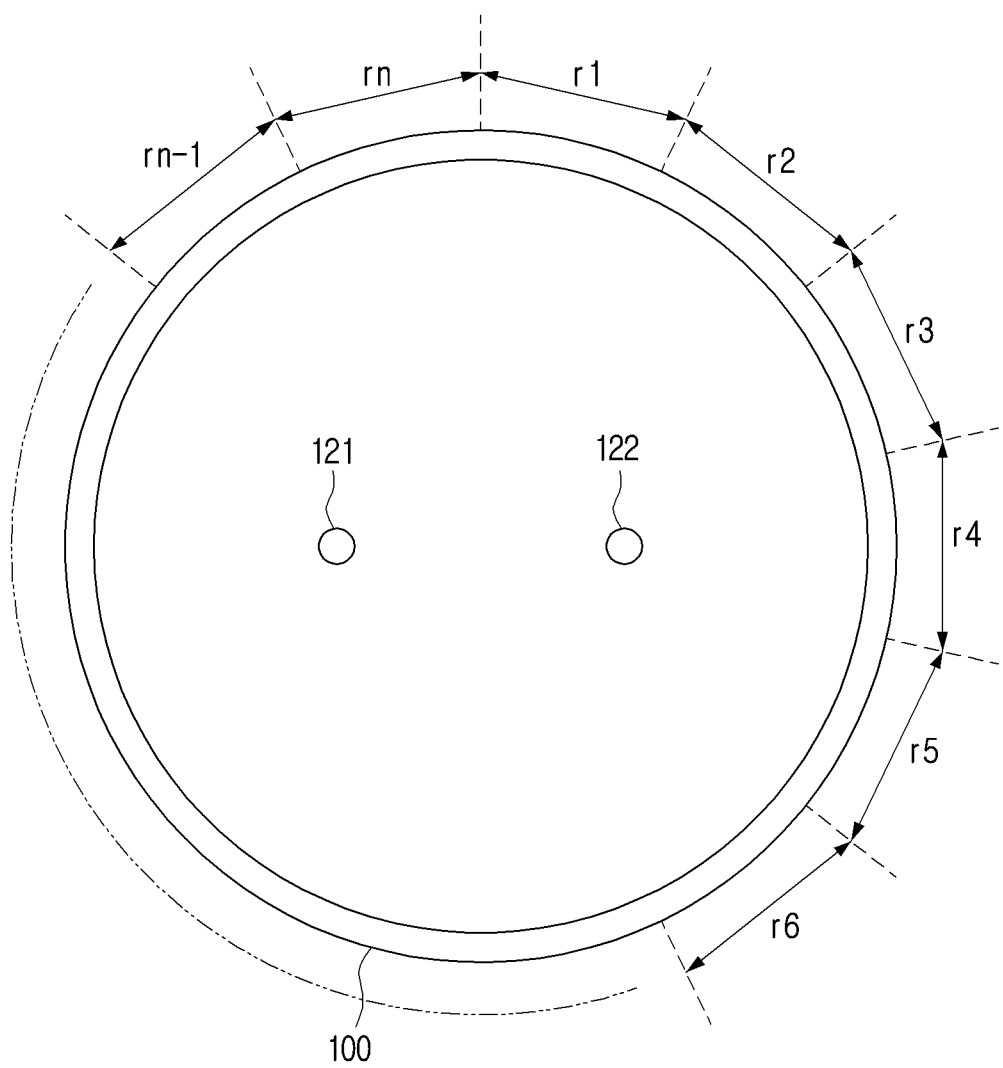
FIG. 6 is a diagram illustrating an example operation of identifying a plurality of reception directions according to various embodiments.

Referring to FIG. 6, the electronic apparatus 100 may include a first microphone 121 and a second microphone 122. The electronic apparatus 100 may receive sound using a plurality of microphones 121 and 122. The electronic apparatus 100 may identify the direction of reception of the sound based on the phase difference of the received sound. For example, the same sound may be different from the time received by the first microphone 121 and the time received by the second microphone 122. The electronic apparatus 100 may identify the direction of reception of the sound based on the phase difference of the received sound.

Here, the receiving direction may be divided according to a predetermined range on the basis of 360 degrees. For example, the receiving direction may be divided into n numbers. Here, n may vary depending on the unique characteristics of the electronic apparatus 100 or the sound receiver 120. For example, the number n may be different depending on the number of microphones including the sound receiver 120 or the performance of the microphone. The greater the number of microphones, the higher the performance of the microphone, the number n of division of the receiving direction may be large.

When identifying the direction of sound using two microphones, two directions may be identified. Since two microphones are used, there are two cases in which the phase difference is the same. For example, a phase difference when a noise source is present in a 1 m North from the electronic apparatus 100 and a phase difference in the case where a noise source is present in a 1 m South from the electronic apparatus 100 may be the same. Accordingly, the electronic apparatus 100 may use various methods to distinguish two embodiments having the same phase difference.

For example, the electronic apparatus 100 may dispose heights of the first microphone 121 and the second microphone 122 differently. The first microphone 121 may be disposed at a first height and the second microphone 122 may be disposed at a second height different from the first height. Since the height is different, the location of the noise source may be accurately specified.

As another example, the electronic apparatus 100 may use a third microphone (not shown) in addition to the first microphone 121 and the second microphone 122. Using three microphones, the location of the noise source may be accurately specified.

Figure 7:
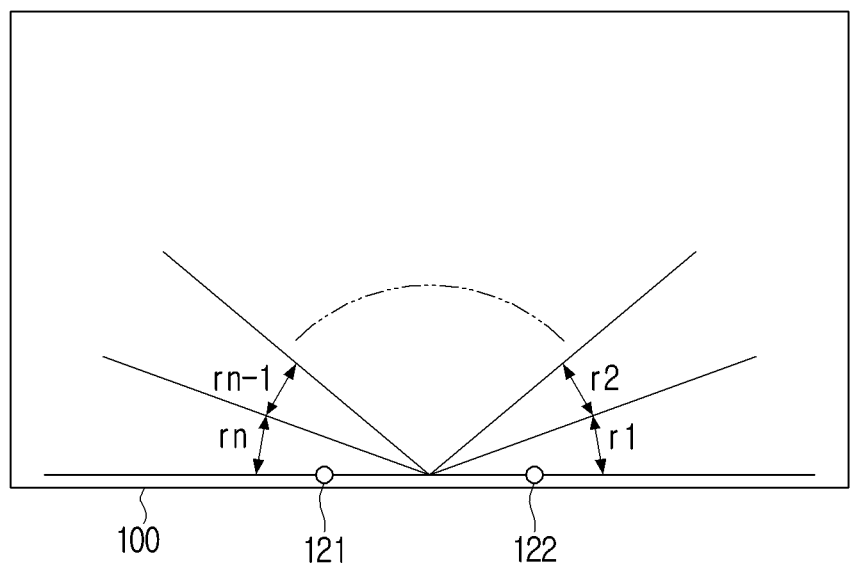
FIG. 7 is a diagram illustrating an example operation of identifying a plurality of reception directions according to various embodiments.

FIG. 7 is a diagram illustrating an example operation of identifying a plurality of reception directions according to an embodiment.

Referring to FIG. 7, the electronic apparatus 100 may include the first microphone 121 and the second microphone 122. The receiving direction may be divided according to a predetermined range based on 180 degrees. For example, the receiving direction may be divided into n numbers. Since the description related to the number n in which the receiving direction is divided was described in FIG. 6, a repeated description may not be repeated here.

FIG. 8 is a table illustrating examples of a first threshold value and a second threshold value corresponding to each of a plurality of reception directions according to various embodiments.

Referring to FIG. 8, a table 805 may include a threshold used for wake-up word similarity. It is assumed that the receiving direction of the sound is divided into n, and the first receiving direction r1 to the nth receiving direction rn are divided. There may be a unique first threshold and a second threshold corresponding to each receiving direction. Here, the first threshold may be a threshold value of the first type and the second threshold may be a threshold value of the second type.

The first threshold may be a value for determining whether a wake-up word is recognized, and the second threshold may be a value used to distinguish a specific noise. Here, the specific noise may refer to a noise source that needs to change a threshold value. For example, a particular sound may be music including a sound or voice of a person. The description related thereto is described in greater detail below with reference to FIG. 14.

Figure 9:
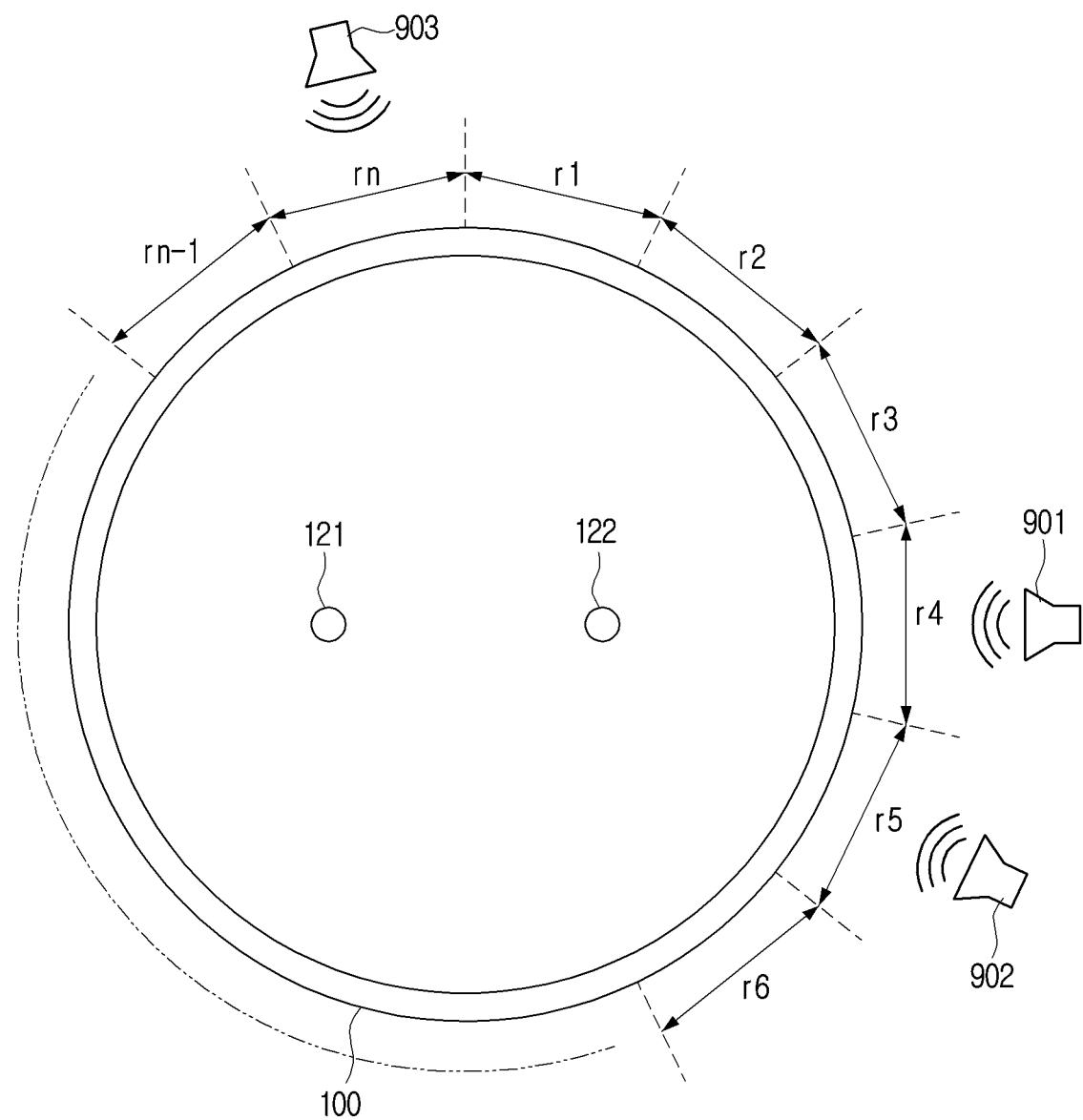
FIG. 9 is a diagram illustrating an example operation of recognizing a plurality of noise sources according to various embodiments.

FIG. 9 is a diagram illustrating an example operation of recognizing a plurality of noise sources according to various embodiments.

Referring to FIG. 9, it is assumed that a first noise source 901, a second noise source 902, and a third noise source 903 are present. Each noise source may generate sound. The electronic apparatus 100 may receive the sound of the noise source and identify the direction of reception of the sound. The electronic apparatus 100 may identify that the sound receiving direction of the first noise source 901 is the fourth receive direction r4. The electronic apparatus 100 may identify that the receiving direction of the second noise source 902 is the fifth receiving direction r5. The electronic apparatus 100 may identify that the receiving direction of the third noise source 903 is the nth receiving direction rn.

Figure 10:
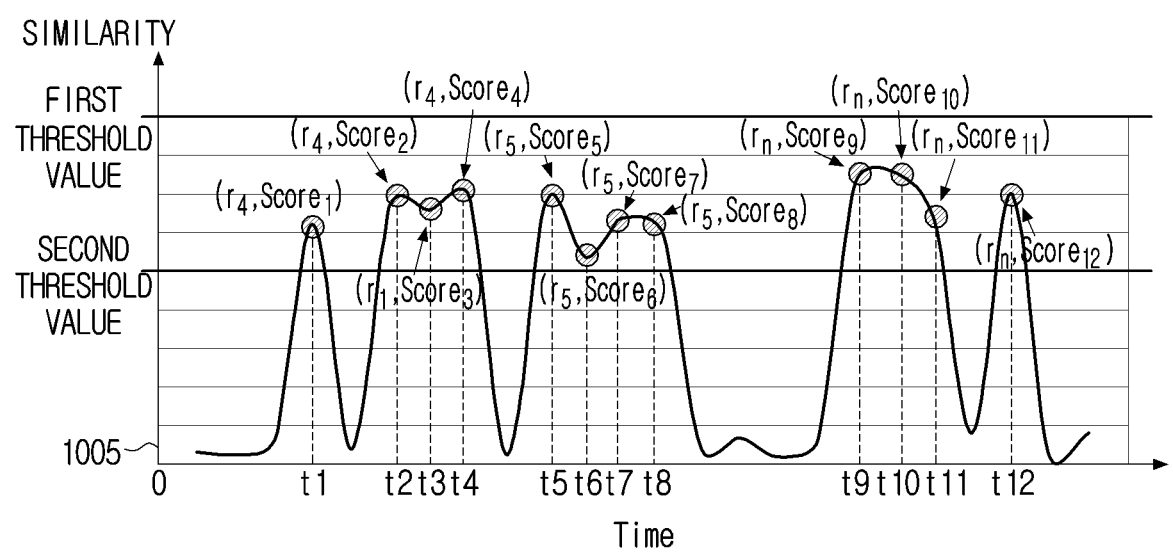
FIG. 10 is a graph illustrating an example operation of changing a first threshold value of a specific reception direction among a plurality of reception directions according to various embodiments.

FIG. 10 is a graph illustrating an example operation of changing a first threshold value of a specific reception direction among a plurality of reception directions according to various embodiments.

Referring to FIG. 10, a graph 1005 may include a similarity associated with a sound received over time. For example, the electronic apparatus 100 may convert the received sound into a digital signal to obtain sound data. The electronic apparatus 100 may obtain similarity between the obtained sound data and the wake-up word.

The direction of reception of the sound received at t1 may be the fourth receiving direction r4, and the similarity may be score1. The direction of reception of the sound received at t2 may be the fourth receiving direction r4, and the similarity may be score2. In addition, the receiving direction of the sound received at time t3 may be the first receiving direction r1, and the similarity may be score3. The direction of reception of the sound received at t4 may be the fourth receive direction r4, and the similarity may be score4. Score 1 to score4 may be less than the first threshold and may be greater than or equal to the second threshold. The electronic apparatus 100 may calculate the number of times of receiving the sound obtained according to the received direction. The number of reception times of the sound received in the fourth receiving direction r4 may be three times, and the number of reception times of the sound received in the first receiving direction r1 may be one time in the time up to t4. The operation associated with the number of reception will be described in greater detail below with reference to FIG. 15.

Figure 11:
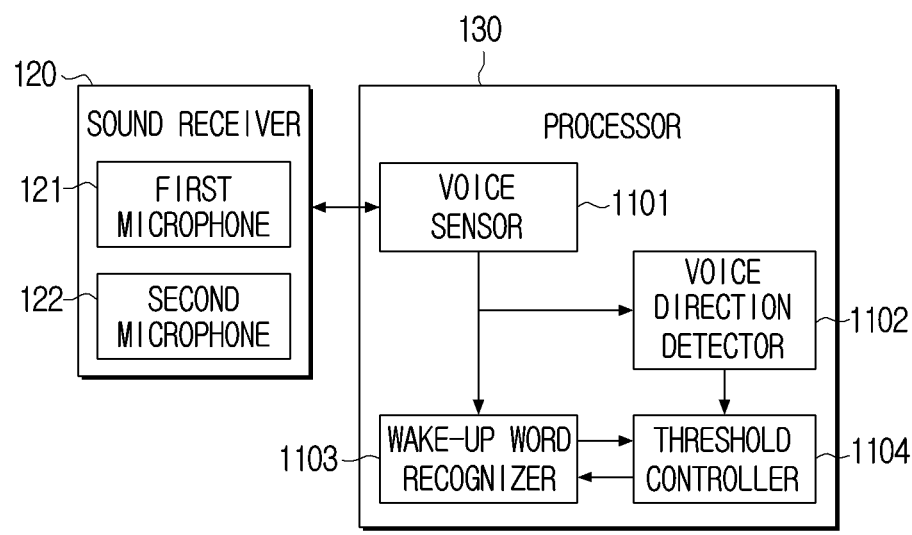
FIG. 11 is a block diagram illustrating an example operation of analyzing sound received from a sound receiver according to various embodiments.

FIG. 11 is a block diagram illustrating an example operation of analyzing sound received from a sound receiver according to various embodiments.

Referring to FIG. 11, the sound receiver 120 may include the first microphone 121 and the second microphone 122. The processor 130 may include at least one of a voice sensor 1101, a voice direction detector (e.g., including various processing circuitry and/or executable program instructions) 1102, a wake-up word recognizer (e.g., including various processing circuitry and/or executable program instructions) 1103, and/or a threshold controller (e.g., including various processing circuitry and/or executable program instructions) 1104.

The voice sensor 1101 may determine whether the sound received from the sound receiver 120 is voice. Here, the sound may be an analog signal, and according to an embodiment, the electronic apparatus 100 may analyze a pattern of the received analog signal to determine whether the sound is a voice or a non-voice. According to an embodiment, the electronic apparatus 100 may convert the sound of the received analog signal to a digital signal. Here, the electronic apparatus 100 may determine whether the sound is a voice or a non-voice based on sound (or sound data) of the converted digital signal.

If the received sound is identified as voice, the electronic apparatus 100 may use the voice direction detector 1102 to identify the direction of reception of the sound. Here, the voice direction detector 1102 may identify the direction of reception of the sound using the phase difference of the same sound received from the plurality of microphones 121 and 122. The voice direction detector 1102 may transmit the identified receiving direction information to the threshold controller 1104. The threshold controller 1104 may transmit a first threshold value and a second threshold value corresponding to the receiving direction to the wake-up word recognizer 1103.

The wake-up word recognizer 1103 may identify whether sound data converted into a digital signal may be recognized as a wake-up word. Specifically, the wake-up word recognizer 1103 may obtain the similarity of the converted sound data, and identify that the sound is a wake-up word if the obtained similarity is greater than or equal to the first threshold value. If the obtained similarity is less than the first threshold value and is greater than or equal to the second threshold value, the wake-up word recognizer 1103 may transmit a control signal requesting a change in the first threshold value to the threshold controller 1104.

The threshold controller 1104 may obtain a control signal requesting a change in the receiving direction transmitted from the voice direction detector 1102 and a first threshold change transmitted from the wake-up word recognizer 1103, and change a first threshold value corresponding to the obtained receiving direction. The changed first threshold value may be transmitted to the wake-up word recognizer 1103.

Figure 12:
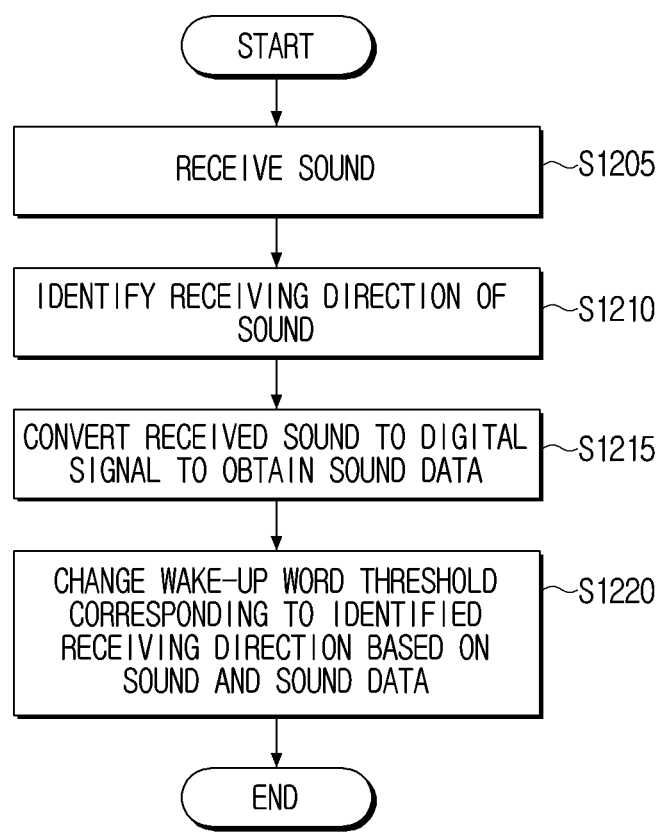
FIG. 12 is a flowchart illustrating an example operation of changing a first threshold value based on sound and sound data according to various embodiments.

FIG. 12 is a flowchart illustrating an example operation of changing a first threshold value based on sound and sound data according to various embodiments.

Referring to FIG. 12, the electronic apparatus 100 may receive sound in operation S1205. The sound may be an analog signal.

The electronic apparatus 100 may identify the direction of reception of the sound in operation S1210. The electronic apparatus 100 may identify a "receiving direction" direction in which a sound is received to determine whether the sound is output in any direction. To identify the receiving direction, the electronic apparatus 100 may use a phase difference of an analog sound signal received from each of the plurality of microphones.

In addition, the electronic apparatus 100 may convert the received sound into a digital signal to obtain sound data in operation S1215. The electronic apparatus 100 may convert the sound of the analog signal into sound of the digital signal. The sound of the digital signal may be written into sound data.

The electronic apparatus 100 may change the wake-up word threshold value corresponding to the identified receiving direction based on the sound and sound data in operation S1220. The changed threshold may refer, for example, to a first threshold value or a second threshold value. The change operation of the first threshold will be described in greater detail below with reference to FIGS. 17-27.

Figure 13:
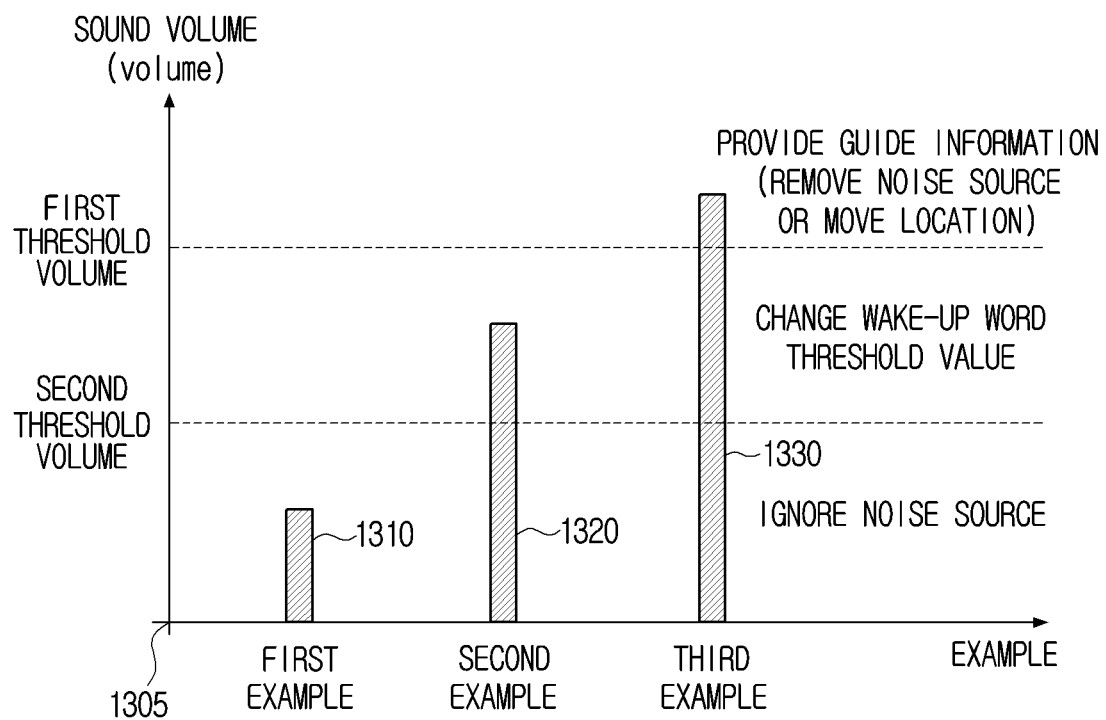
FIG. 13 is a graph illustrating an example operation performed based on a sound volume according to various embodiments.

FIG. 13 is a graph illustrating an example operation performed based on a sound volume according to various embodiments.

Referring to FIG. 13, a graph 1305 may include a plurality of examples 1310, 1320, 1330 with different sound volume.

According to the first example 1310, if the sound volume is less than the second threshold volume, the electronic apparatus 100 may ignore the noise source of the sound. If the sound volume is small, it may have little impact on the recognition rate of the wake-up word.

In accordance with the second example 1320, if the volume of the sound is greater than or equal to the second threshold volume and less than the first threshold volume, the electronic apparatus 100 may change the threshold value corresponding to the direction of reception of the sound.

According to the third example 1330, if the sound volume is greater than or equal to the first threshold volume, the electronic apparatus 100 may provide guide information. The guide information will be described in FIGS. 28-32.

FIG. 14 is a graph illustrating an example operation performed based on similarity according to various embodiments.

Referring to FIG. 14, a graph 1405 may include a plurality of examples 1410, 1420, 1430 having different similarities.

According a fourth example 1410, if the similarity is less than the second threshold value, the electronic apparatus 100 may ignore the noise source of the sound. If the similarity is small, it has little effect on the recognition rate of the wake-up word. Sounds with small similarities may be mechanical sounds or irregularly generated life noises According to a fifth example 1420, if the similarity is greater than or equal to the second threshold value and less than the first threshold value, the electronic apparatus 100 may change the threshold value corresponding to the direction of reception of the sound.

According to a sixth example 1430, if the similarity is greater than or equal to the first threshold, the electronic apparatus 100 may recognize that the received sound includes a wake-up word. The electronic apparatus 100 may perform a voice recognition function. The electronic apparatus 100 may execute a voice recognition-related application and perform voice recognition on a subsequent utterance (or subsequent sound).

Figure 15:
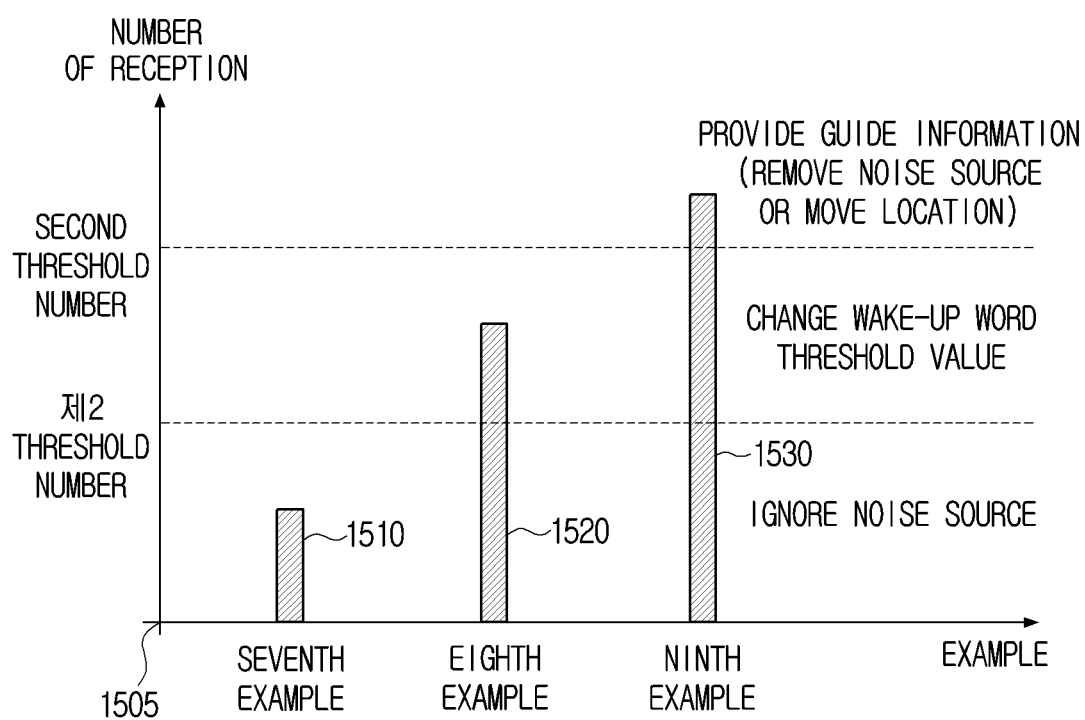
FIG. 15 is a graph illustrating an example operation performed on the basis of the number of repetitions of a noise source according to various embodiments.

FIG. 15 is a graph illustrating an example operation performed on the basis of the number of repetitions of a noise source according to various embodiments.

Referring to FIG. 15, a graph 1505 may include a plurality of examples 1510, 1520, 1530 where the number of times the sound is received is different. The number of times of reception may be accumulated separately according to the receiving direction. For example, if the number of reception times from 0 to T4 in the graph 1005 of FIG. 10 is identified, the number of reception times in the fourth receiving direction is three times and the number of reception times in the first receiving direction may be one time.

According to a seventh example 1510, if the number of times of reception is less than the second threshold number, the electronic apparatus 100 may ignore the noise source of the sound. This is because the received sound may be a temporary noise when the number of times of reception is small.

According to an eighth example 1520, if the number of times of reception is greater than or equal to the second threshold number and less than the first threshold number, the electronic apparatus 100 may change a threshold value corresponding to the direction of reception of the sound.

According to a ninth example 1530, if the number of times of reception is equal to or greater than the first threshold number, the electronic apparatus 100 may provide guide information. The guide information will be described in FIGS. 28-32.

Figure 16:
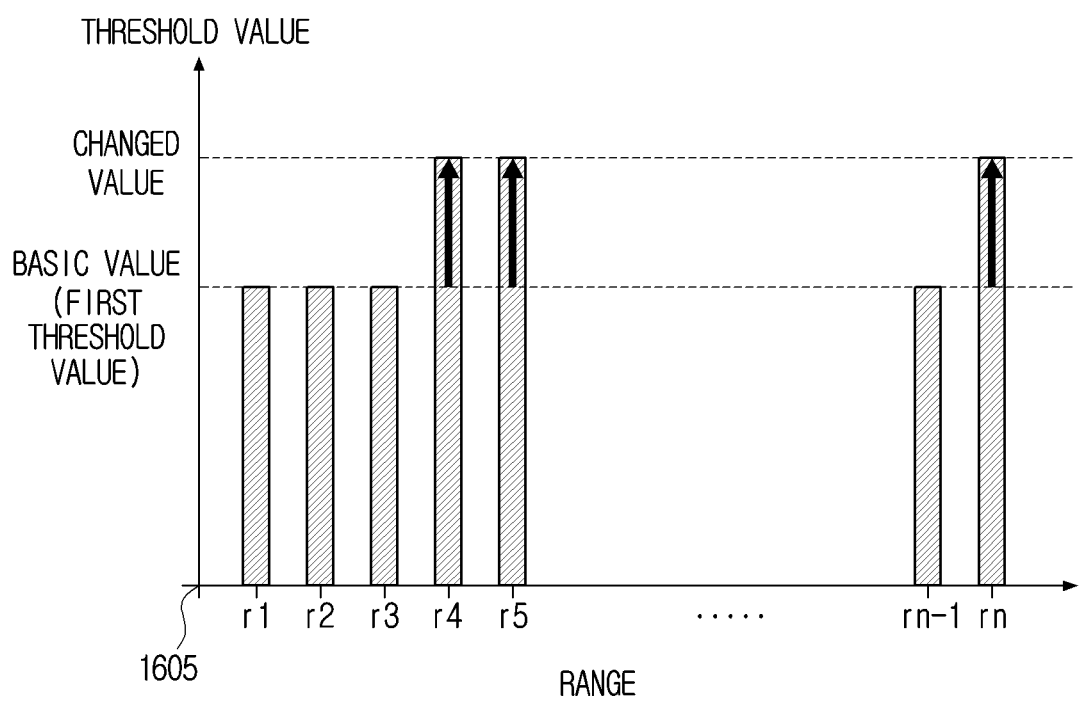
FIG. 16 is a graph illustrating a difference between a first threshold value and a second threshold value according to various embodiments.

FIG. 16 is a graph illustrating an example difference between a first threshold value and a second threshold value according to various embodiments.

Referring to FIG. 16, the graph 1605 may include a threshold value corresponding to each of the plurality of receiving directions r1 to rn. The first threshold value corresponding to the plurality of receiving directions r1 to rn is a basic threshold value (or basic value) and may be all the same. It is assumed that the plurality of noise sources are identified in the fourth receiving direction, the fifth receiving direction, and the nth receiving direction, as in the embodiment illustrated in FIG. 9. It is assumed that the similarity corresponding to the plurality of noise sources is less than the first threshold value and the second threshold value is greater than or equal to the second threshold value. The electronic apparatus 100 may change a first threshold value corresponding to a fourth receiving direction, a first threshold value corresponding to a fifth receiving direction, and a first threshold value corresponding to the nth receiving direction.

The changed first threshold may be greater than the first threshold before changing. An operation that greatly changes the first threshold may be that requires a higher accuracy to recognize the wake-up word.

Referring to FIG. 16, an example in which the threshold value is increased was described. However, depending on the embodiment, there may be an embodiment in which the threshold value falls. For example, when increasing the first threshold, it is necessary to pronounce the wake-up word more loudly and accurately. Conversely, if the first threshold is lowered, there is a need to pronounce the wake-up word less accurately. In this case, considering the situation that the recognition of the wake-up word becomes difficult due to ambient noise, it is possible to lower the first threshold value in order to more easily recognize the wake-up word. However, if the first threshold value is lowered, there may be a disadvantage in that misrecognition is increased. Thus, the first threshold may be increased or changed depending on the user's setting.

Figure 17:
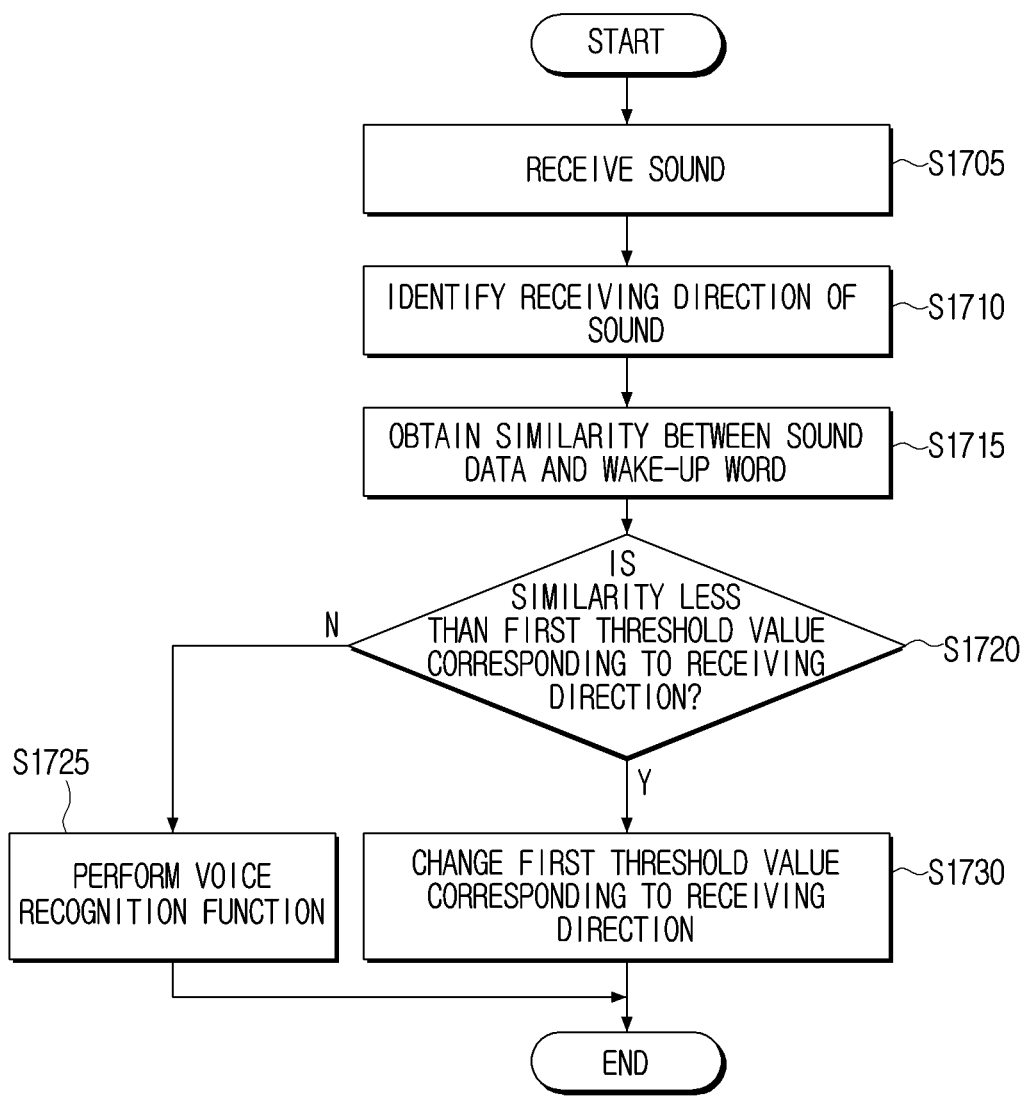
FIG. 17 is a flowchart illustrating an example operation of changing a first threshold value in consideration of a first threshold value according to various embodiments.

FIG. 17 is a flowchart illustrating an example operation of changing a first threshold value in consideration of a first threshold value according to various embodiments.

Referring to FIG. 17, the electronic apparatus 100 may receive sound in operation S1705. The electronic apparatus 100 may identify the receiving direction of the received sound in operation S1710. The electronic apparatus 100 may obtain the similarity between the sound data and the wake-up word in operation S1715. The sound data may refer, for example, to data in which the sound of an analog signal is converted into a digital signal. The sound data may refer, for example, to data in which the data of the digital signal is converted into text data.

The electronic apparatus 100 may obtain a first threshold value corresponding to the direction of reception identified in operation S1710. Here, the first threshold value may be a predetermined threshold value according to each of the plurality of receiving directions, as shown in a table 805 of FIG. 8. The electronic apparatus 100 may identify whether the similarity is less than a first threshold value corresponding to the receiving direction in operation S1720.

If the similarity is greater than or equal to the first threshold value corresponding to the receiving direction in operation S1720-N, the electronic apparatus 100 may identify that the sound (or sound data) is recognized as a wake-up word. Accordingly, the electronic apparatus 100 may perform a voice recognition function in operation S1725. Here, the voice recognition function may refer, for example, to an operation of executing a voice recognition application.

If the similarity is less than the first threshold value corresponding to the receiving direction in operation S1720-Y, the electronic apparatus 100 may change the first threshold value corresponding to the receiving direction in operation S1730.

Figure 18:
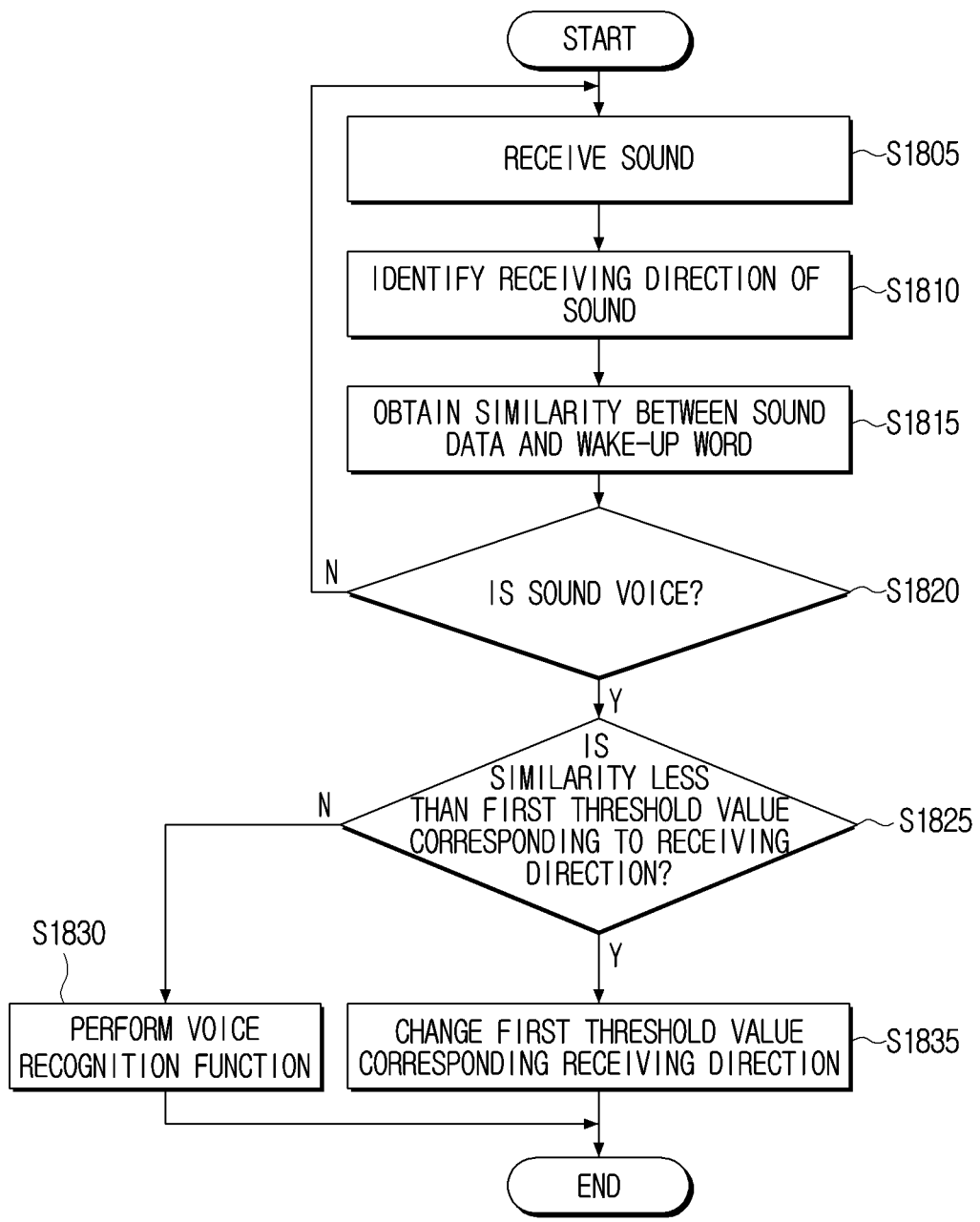
FIG. 18 is a flowchart illustrating an example operation of determining whether a sound is a voice according to various embodiments.

FIG. 18 is a flowchart illustrating an example operation of determining whether a sound is a voice according to various embodiments.

Referring to FIG. 18, the operations of S1805, S1810, S1815, S1830, and S1835 may correspond to S1705, S1710, S1715, S1725, and S1730 of FIG. 17. Therefore, some duplicate descriptions may not be repeated here.

The electronic apparatus 100 may receive sound in operation S1805, identify the direction of reception of the sound in operation S1810, and obtain the similarity between the sound data and the wake-up word in operation S1815.

The electronic apparatus 100 may identify whether the received sound is a voice in operation S1820. The voice may refer, for example, to voice of a human or various sound sources that may be recognized as a person's voice.

If the sound is identified as non-voice in operation S1820-N, the electronic apparatus 100 may repeatedly receive sound. If the sound is identified as voice in operation S1820-Y, the electronic apparatus 100 may identify whether the similarity is less than a first threshold value corresponding to the receiving direction in operation S1825.

If the similarity is greater than or equal to the first threshold value corresponding to the receiving direction in operation S1825-N, the electronic apparatus 100 may perform a voice recognition function in operation S1830. If the similarity is less than the first threshold value corresponding to the receiving direction in operation S1825-Y, the electronic apparatus 100 may change the first threshold value corresponding to the receiving direction in operation S1835.

In FIG. 18, an operation S1820 of identifying the direction of reception of the sound and identifying whether the sound is voice after obtaining the similarity is described. However, according to an implementation, the operation of identifying whether the sound is voice may be performed prior to steps S1810 and S1815. If the sound is not voice, the similarity may not be obtained without identifying the receiving direction.

Figure 19:
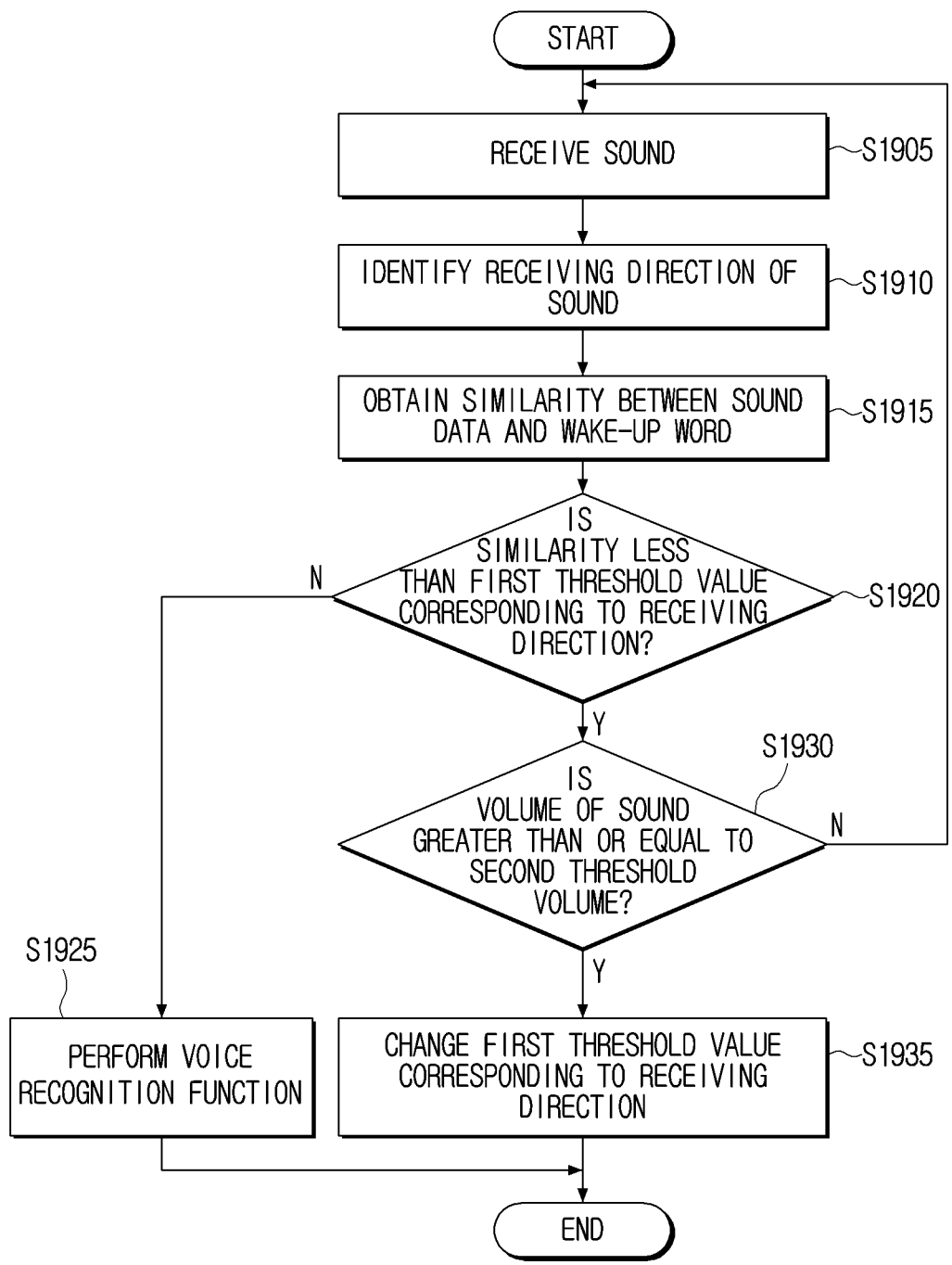
FIG. 19 is a flowchart illustrating an example operation of changing a first threshold value based on a sound volume, according to various embodiments.

FIG. 19 is a flowchart illustrating an example operation of changing a first threshold value based on a sound volume, according to various embodiments.

Referring to FIG. 19, the operations of S1905, S1910, S1915, S1925, and S1935 may correspond to S1705, S1710, S1715, S1725, and S1730 of FIG. 17. Therefore, some duplicate descriptions may not be repeated here.

The electronic apparatus 100 may receive sound in operation S1905, identify the direction of reception of the sound in operation S1910, and obtain the similarity between the sound data and the wake-up word in operation S1915. The electronic apparatus 100 may identify whether the similarity is less than a first threshold value corresponding to the receiving direction in operation S1920. If the similarity is greater than or equal to a first threshold value corresponding to the receiving direction in operation S1920-N, the electronic apparatus 100 may perform a voice recognition function in operation S1925.

If the similarity is less than the first threshold value corresponding to the receiving direction in operation S1920-Y, the electronic apparatus 100 may identify whether the volume of the sound is greater than or equal to the second threshold size in operation S1930. If the volume of the sound is less than the second threshold size in operation S1930-N, the electronic apparatus 100 may repeatedly receive sound. If the volume of the sound is greater than or equal to the second threshold size in operation S1930-Y, the electronic apparatus 100 may change the first threshold value corresponding to the receiving direction in operation S1935.

Figure 20:
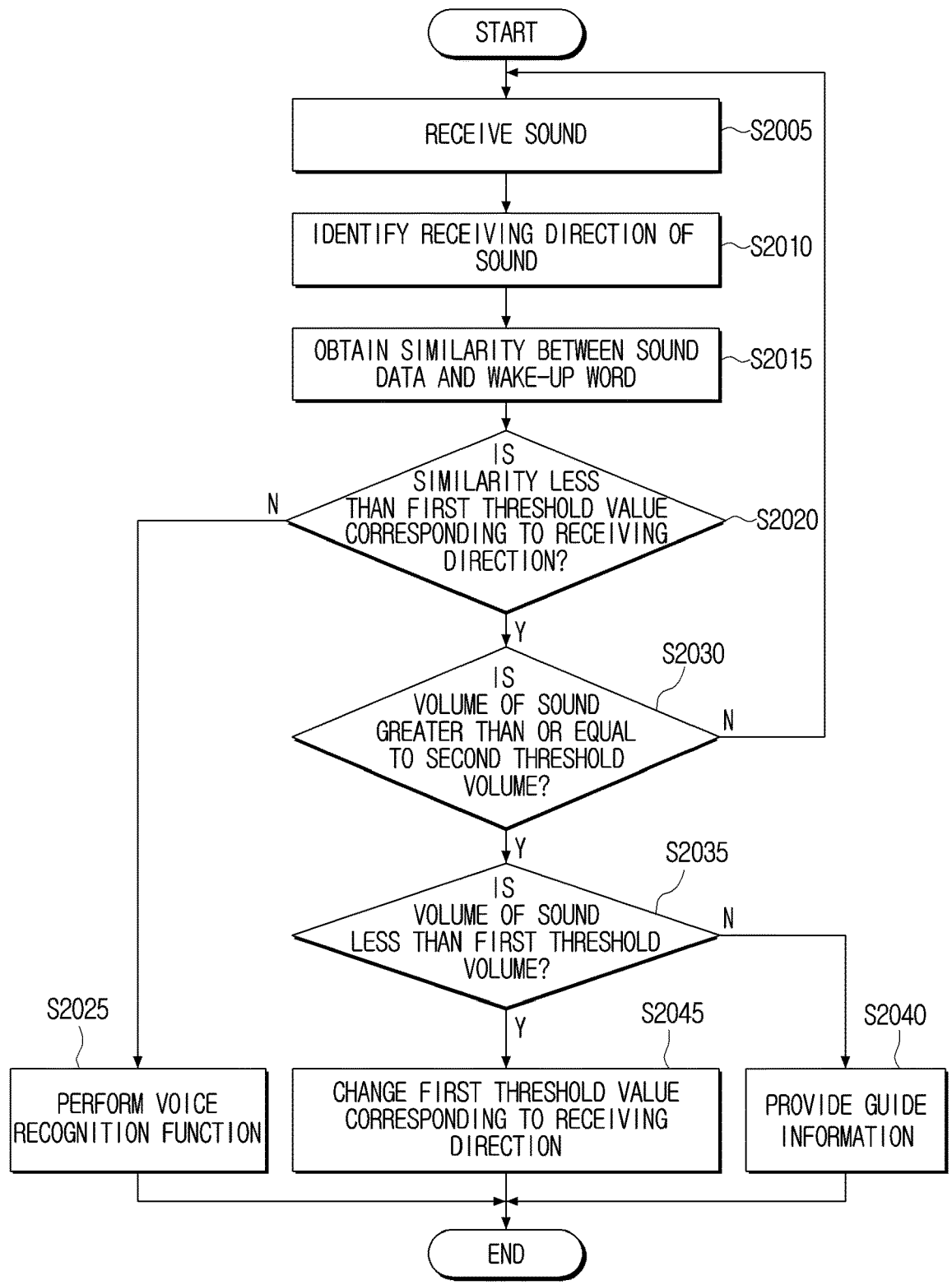
FIG. 20 is a flowchart illustrating an example operation of changing a first threshold value based on a sound volume according to various embodiments.

FIG. 20 is a flowchart illustrating an example operation of changing a first threshold value based on a sound volume according to various embodiments.

Referring to FIG. 20, the operations of S2005, S2010, S2015, S2025, and S2045 may correspond to S1705, S1710, S1715, S1725, and S1730 of FIG. 17. Therefore, some duplicate descriptions may not be repeated here.

The electronic apparatus 100 may receive sound in operation S2005, identify the direction of reception of the sound in operation S2010, and obtain the similarity between the sound data and the wake-up word in operation S2015. The electronic apparatus 100 may identify whether the similarity is less than a first threshold value corresponding to the receiving direction in operation S2020. If the similarity is greater than or equal to a first threshold value corresponding to the receiving direction in operation S2020-N, the electronic apparatus 100 may perform a voice recognition function in operation S2025.

If the similarity is less than the first threshold value corresponding to the receiving direction in operation S2020-Y, the electronic apparatus 100 may identify whether the volume of the sound is greater than or equal to the second threshold volume in operation S2030. If the volume of the sound is less than the second threshold volume in operation S2030-N, the electronic apparatus 100 may repeatedly receive sound. If the volume of the sound is greater than or equal to the second threshold volume in operation S2030-Y, the electronic apparatus 100 may identify whether the volume of the sound is less than the first threshold volume in operation S2035.

If the volume of the sound is greater than or equal to the first threshold volume in operation S2035-N, the electronic apparatus 100 may provide the guide information in operation S2030. The description related to the guide information will be described in greater detail below with reference to FIGS. 28-32.

If the volume of the sound is less than the first threshold size in operation S2035-Y, the electronic apparatus 100 may change the first threshold value corresponding to the receiving direction in operation S2045.

Figure 21:
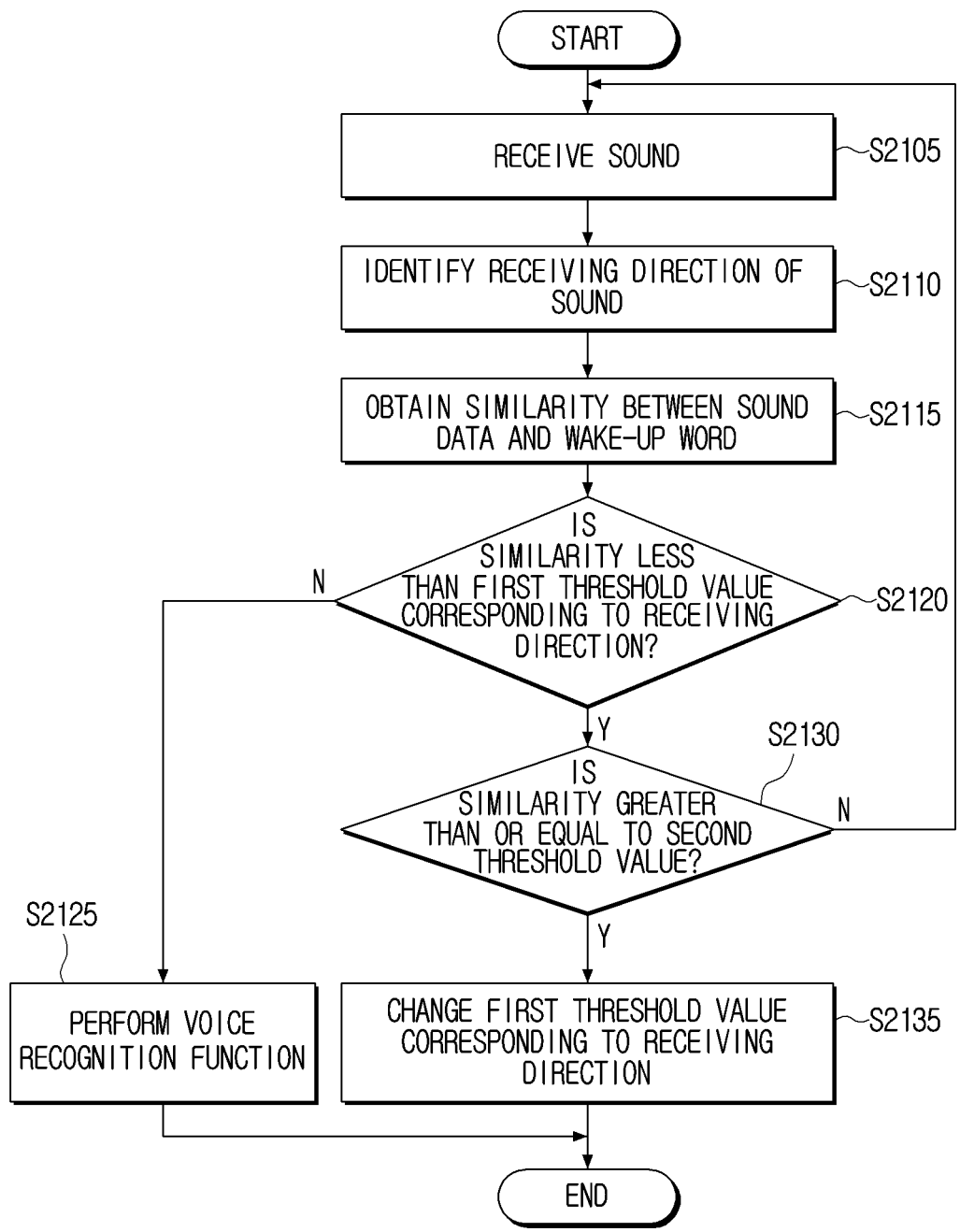
FIG. 21 is a flowchart illustrating an example operation of changing a first threshold value based on a similarity according to various embodiments.

FIG. 21 is a flowchart illustrating an example operation of changing a first threshold value based on a similarity according to various embodiments.

Referring to FIG. 21, the operations of S2105, S2110, S2115, S2125, and S2135 may correspond to S1705, S1710, S1715, S1725, and S1730 of FIG. 17. Therefore, some duplicate descriptions may not be repeated here.

The electronic apparatus 100 may receive the sound in operation S2105, identify the direction of reception of the sound in operation S2110, and obtain the similarity between the sound data and the wake-up word in operation S2115. The electronic apparatus 100 may identify whether the similarity is less than a first threshold value corresponding to the receiving direction in operation S2120. If the similarity is greater than or equal to a first threshold value corresponding to the receiving direction in operation S2120-N, the electronic apparatus 100 may perform a voice recognition function in operation S2125.

If the similarity is less than a first threshold value corresponding to the receiving direction in operation S2120-Y, the electronic apparatus 100 may identify whether the similarity is greater than or equal to a second threshold value corresponding to the receiving direction in operation S2130. If the similarity is less than the second threshold value in operation S2130-N corresponding to the receiving direction, the electronic apparatus 100 may repeatedly receive sound.

If the second threshold value corresponding to the receiving direction is greater than or equal to the second threshold value in operation S2130-Y, the electronic apparatus 100 may change the first threshold value corresponding to the receiving direction in operation S2135.

Figure 22:
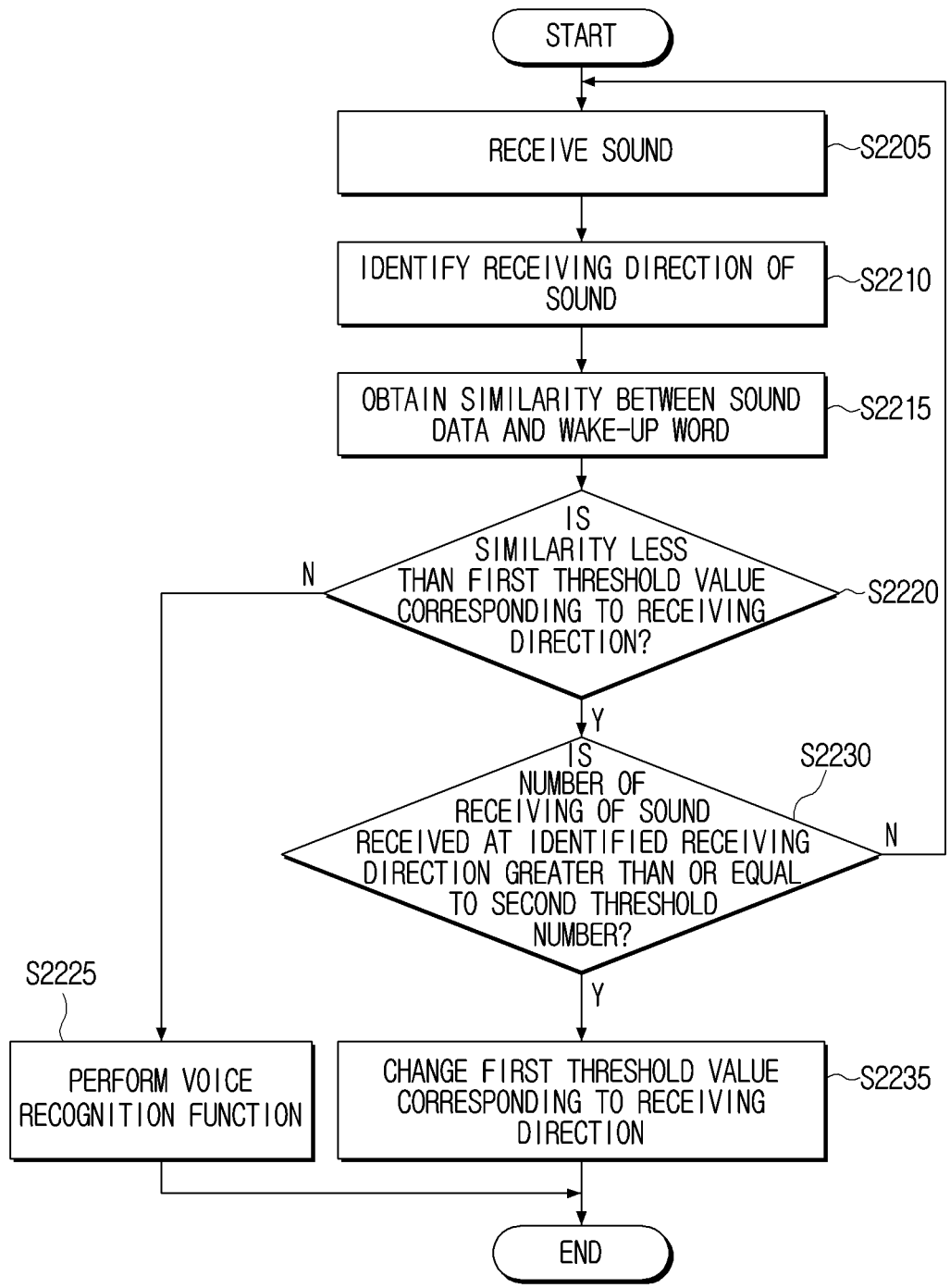
FIG. 22 is a flowchart illustrating an example operation of changing a first threshold value based on the number of sound reception according to various embodiments.

FIG. 22 is a flowchart illustrating an example operation of changing a first threshold value based on the number of sound reception according to various embodiments.

Referring to FIG. 22, operations S2205, S2210, S2215, S2225, and S2235 may correspond to operations S1705, S1710, S1715, S1725, and S1730 of FIG. 17. Therefore, some duplicate description may not be repeated here.

The electronic apparatus 100 may receive the sound in operation S2205, identify the direction of reception of the sound in operation S2210, and obtain the similarity between the sound data and the wake-up word in operation S2215. The electronic apparatus 100 may identify whether the similarity is less than a first threshold value corresponding to the receiving direction in operation S2220. If the similarity is greater than a first threshold value corresponding to the receiving direction in operation S2220-N, the electronic apparatus 100 may perform a voice recognition function in operation S2225.

If the similarity is less than the first threshold value corresponding to the receiving direction in operation S2220-Y, the electronic apparatus 100 may identify whether the number of reception of the sound received in the identified receiving direction is greater than or equal to the second threshold number in operation S2230. If the number of times of reception is less than the second threshold number in operation S2230-N, the electronic apparatus 100 may repeatedly receive sound.

If the number of times of reception is equal to or greater than the second threshold number in operation S2230-Y, the first threshold value corresponding to the receiving direction may be changed in operation S2235.

Figure 23:
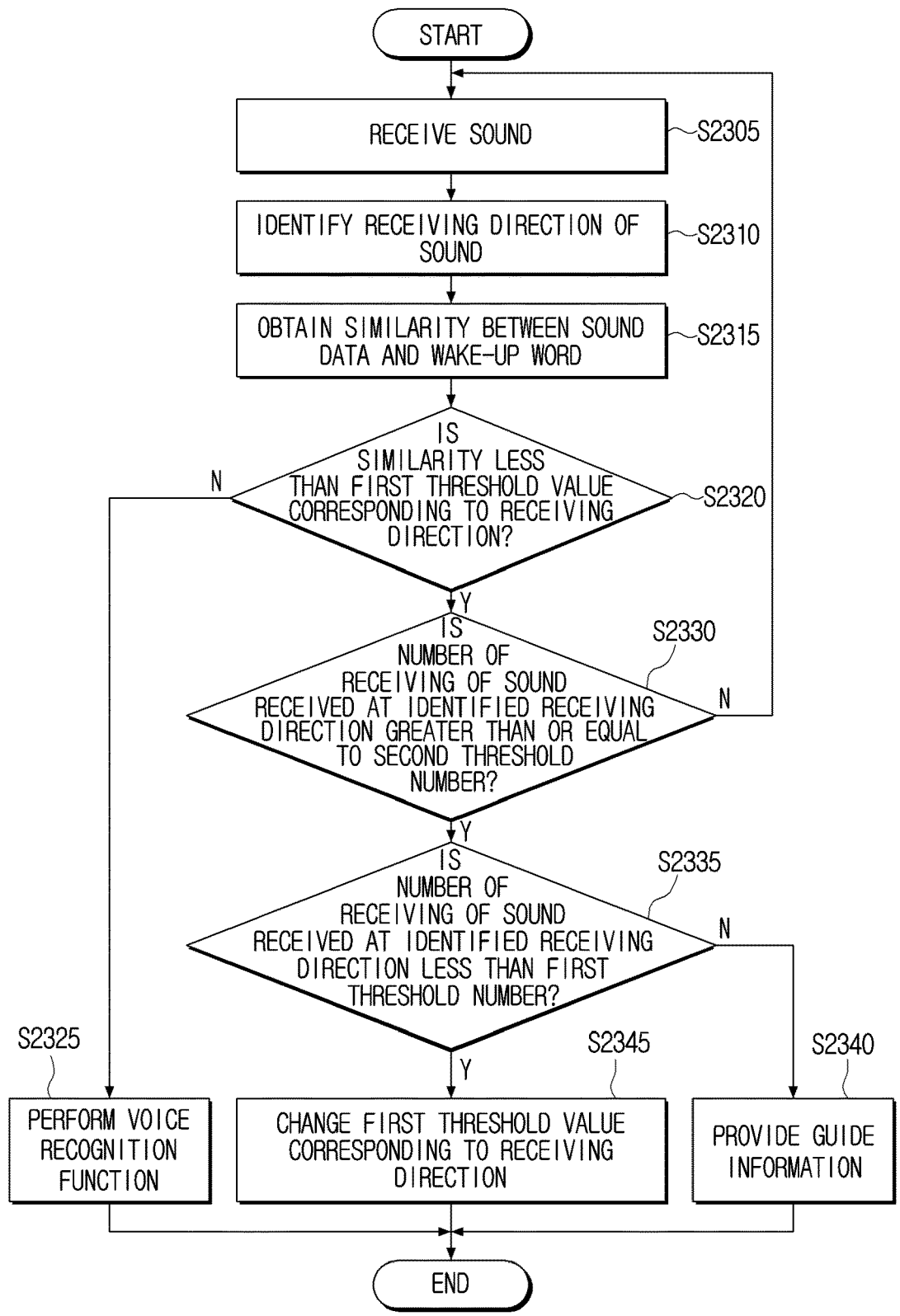
FIG. 23 is a flowchart illustrating an example operation of changing a first threshold value based on the number of sound reception according to various embodiments.

FIG. 23 is a flowchart illustrating an example operation of changing a first threshold value based on the number of sound reception according to various embodiments.

Referring to FIG. 23, operations S2305, S2310, S2315, S2325, and S2335 may correspond to operations S1705, S1710, S1715, S1725, and S1730 of FIG. 17. Therefore, some duplicate description may not be repeated here.

The electronic apparatus 100 may receive the sound in operation S2305, identify the direction of reception of the sound, and obtain the similarity between the sound data and the wake-up word in operation S2315. The electronic apparatus 100 may identify whether the similarity is less than a first threshold value corresponding to the receiving direction in operation S2320. If the similarity is greater than or equal to a first threshold value corresponding to the receiving direction in operation S2320-N, the electronic apparatus 100 may perform a voice recognition function in operation S2325.

If the similarity is less than the first threshold value corresponding to the receiving direction in operation S2320-Y, the electronic apparatus 100 may identify whether the number of reception of the sound received in the identified receiving direction is greater than or equal to the second threshold number in operation S2330. If the number of times of reception is less than the second threshold number in operation S2330-N, the electronic apparatus 100 may repeatedly receive sound.

If the number of times of reception is equal to or greater than the second threshold number in operation S2230, it is possible to identify whether the number of reception times received in the identified receiving direction is less than the first threshold number in operation S2335. If the number of times of reception is greater than or equal to the first threshold number in operation S2235-N, the electronic apparatus 100 may provide the guide information in operation S2340. The guide information will be described in greater detail below with reference to FIGS. 27-32.

If the number of times of reception is less than the first threshold number in operation S2235-Y, the electronic apparatus 100 may change the first threshold value corresponding to the receiving direction in operation S2345.

Figure 24:
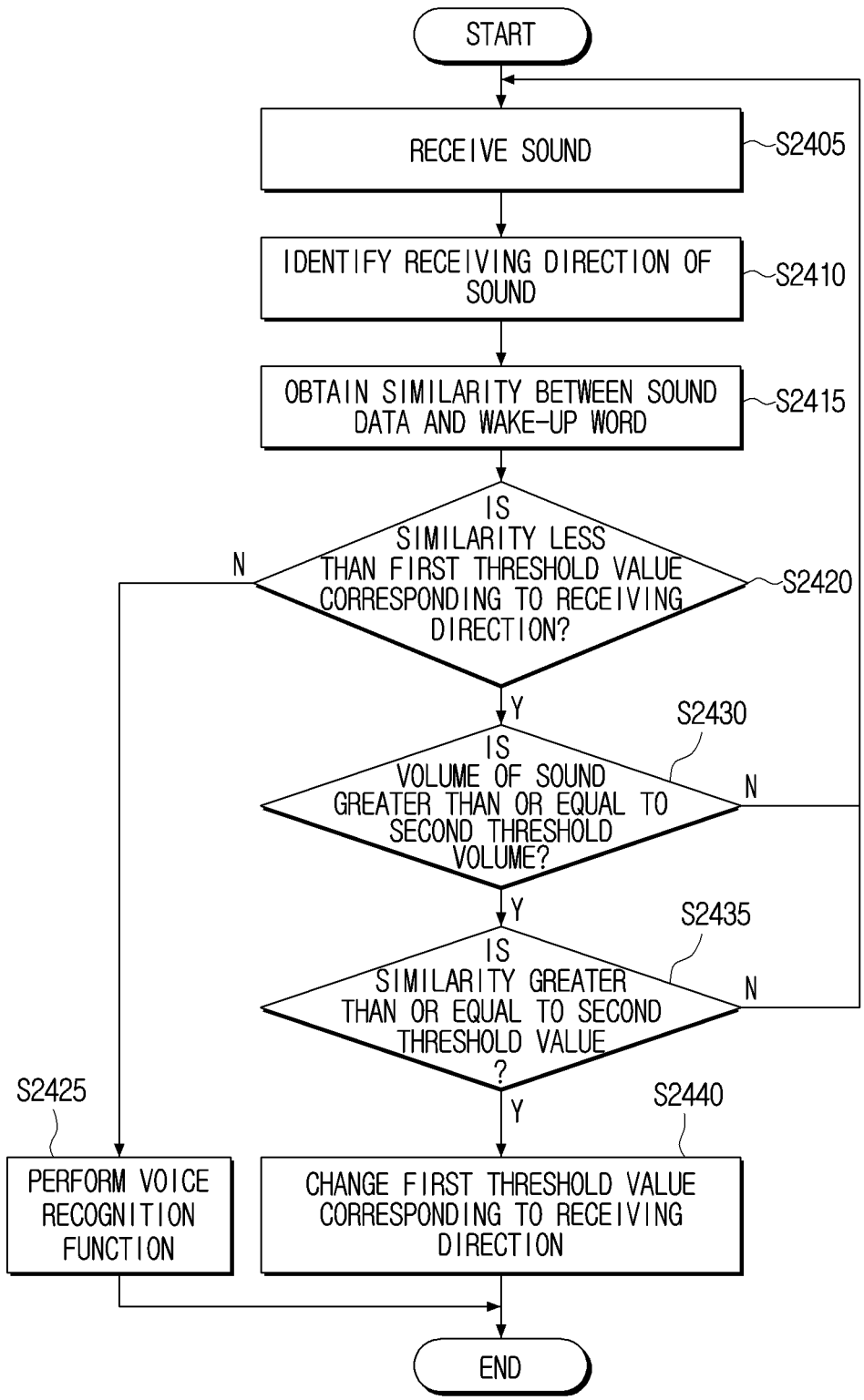
FIG. 24 is a flowchart illustrating an example operation of changing a first threshold value based on a sound volume and a similarity according to various embodiments.

FIG. 24 is a flowchart illustrating an example operation of changing a first threshold value based on a sound volume and a similarity according to various embodiments.

Referring to FIG. 24, operations S2405, S2410, S2415, S2425, and S2440 may correspond to operations S1705, S1710, S1715, S1725, and S1730 of FIG. 17. Therefore, some duplicate description may not be repeated here.

The electronic apparatus 100 may receive the sound in operation S2405, identify the direction of reception of the sound in operation S2410, and obtain the similarity between the sound data and the wake-up word in operation S2415. The electronic apparatus 100 may identify whether the similarity is less than a first threshold value corresponding to the receiving direction in operation S2420. If the similarity is greater than or equal to a first threshold value corresponding to the receiving direction in operation S2420-N, the electronic apparatus 100 may perform a voice recognition function in operation S2425.

If the similarity is less than the first threshold value corresponding to the receiving direction in operation S2420-Y, the electronic apparatus 100 may identify whether the volume of the sound is greater than or equal to the second threshold volume in operation S2430. If the volume of the sound is less than the second threshold size in operation S2430-N, the electronic apparatus 100 may repeatedly receive sound.

If the volume of the sound is greater than or equal to the second threshold volume in operation S2430-Y, the electronic apparatus 100 may identify whether the similarity is greater than or equal to the second threshold in operation S2435. If the similarity is less than the second threshold value in operation S2435-N, the electronic apparatus 100 may repeatedly receive sound.

If the similarity is greater than or equal to the second threshold value in operation S2435-Y, the electronic apparatus 100 may change the first threshold value corresponding to the receiving direction in operation S2440.

Figure 25:
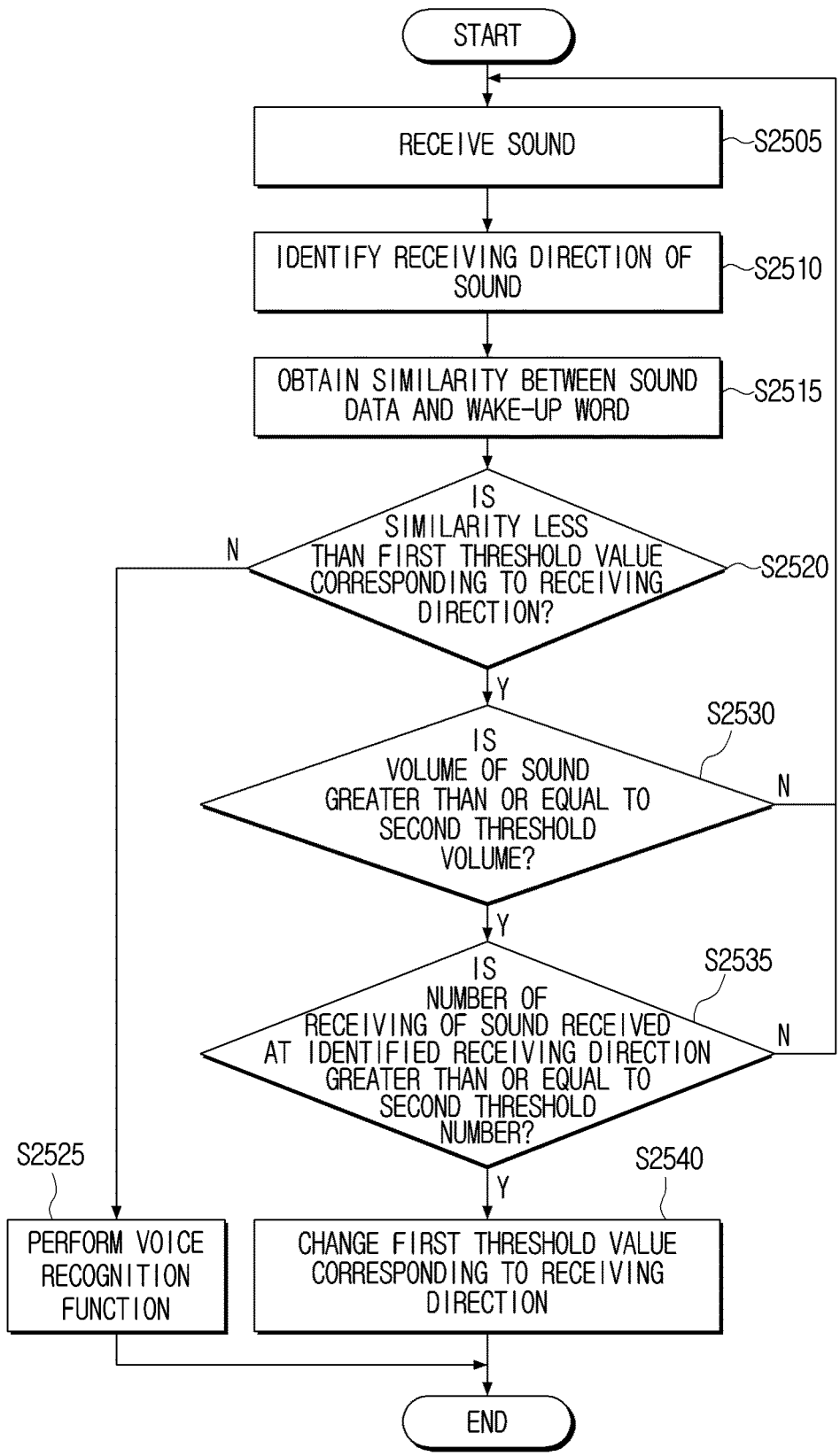
FIG. 25 is a flowchart illustrating an example operation of changing a first threshold value based on a sound volume and a sound receiving frequency according to various embodiments.

FIG. 25 is a flowchart illustrating an example operation of changing a first threshold value based on a sound volume and a sound receiving frequency according to various embodiments.

Referring to FIG. 25, operations S2505, S2510, S2515, S2525, and S2540 may correspond to operations S1705, S1710, S1715, S1725, and S1730 of FIG. 17. Therefore, some duplicate description may not be repeated here.

The electronic apparatus 100 may receive sound in operation S2505, identify the direction of reception of the sound in operation S2510, and obtain the similarity between the sound data and the wake-up word in operation S2515. The electronic apparatus 100 may identify whether the similarity is less than a first threshold value corresponding to the receiving direction in operation S2520. If the similarity is greater than or equal to a first threshold value corresponding to the receiving direction in operation S2520-N, the electronic apparatus 100 may perform a voice recognition function in operation S2525.

If the similarity is less than the first threshold value corresponding to the receiving direction in operation S2520-Y, the electronic apparatus 100 may identify whether the volume of the sound is greater than or equal to the second threshold volume in operation S2530. If the volume of the sound is less than the second threshold volume in operation S2530-N, the electronic apparatus 100 may repeatedly receive sound.

If the volume of the sound is greater than or equal to the second threshold volume in operation S2530-Y, the electronic apparatus 100 may identify whether the number of reception of the sound received in the identified receiving direction is greater than or equal to the second threshold number in operation S2535. If the number of times of reception is less than the second threshold number in operation S2535-N, the electronic apparatus 100 may repeatedly receive sound.

If the number of times of reception is equal to or greater than the second threshold number in operation S2535-Y, the electronic apparatus 100 may change the first threshold value corresponding to the receiving direction in operation S2540.

Figure 26:
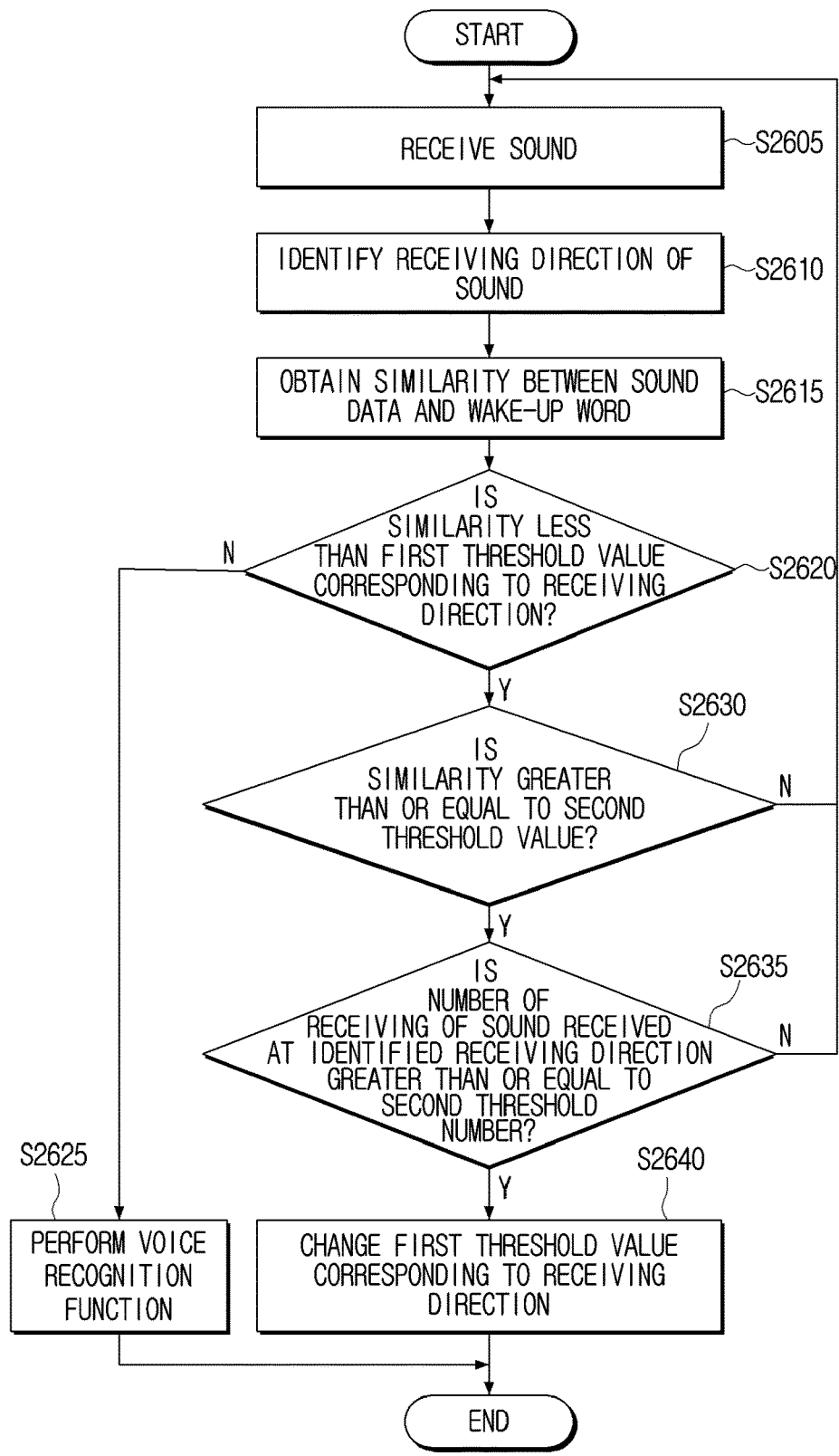
FIG. 26 is a flowchart illustrating an example operation of changing a first threshold value based on similarity and sound reception frequency according to various embodiments.

FIG. 26 is a flowchart illustrating an example operation of changing a first threshold value based on similarity and sound reception frequency according to various embodiments.

Referring to FIG. 26, operations S2605, S2610, S2615, S2625, and S2640 may correspond to operations S1705, S1710, S1715, S1725, and S1730 of FIG. 17. Therefore, some duplicate description may not be repeated here.

The electronic apparatus 100 may receive the sound in operation S2605, identify the direction of reception of the sound in operation S2610, and obtain the similarity between the sound data and the wake-up word in operation S2615. The electronic apparatus 100 may identify whether the similarity is less than a first threshold value corresponding to the receiving direction in operation S2620. If the similarity is greater than or equal to a first threshold value corresponding to the receiving direction in operation S2620-N, the electronic apparatus 100 may perform a voice recognition function in operation S2625.

If the similarity is less than a first threshold value corresponding to the receiving direction in operation S2620-Y, the electronic apparatus 100 may identify whether the similarity is greater than or equal to a second threshold value corresponding to the receiving direction in operation S2630. If the similarity is less than a second threshold value corresponding to the receiving direction in operation S2630-N, the electronic apparatus 100 may repeatedly receive sound.

If the second threshold value corresponding to the receiving direction is greater than or equal to the second threshold value in operation S2630-Y, the electronic apparatus 100 may identify whether the number of reception of the sound received in the identified receiving direction is greater than or equal to the second threshold number in operation S2635. If the number of times of reception is less than the second threshold number in operation S2635-N, the electronic apparatus 100 may repeatedly receive sound.

If the number of times of reception is equal to or greater than the second threshold number in operation S2635-Y, the electronic apparatus 100 may change the first threshold value corresponding to the receiving direction in operation S2640.

Figure 27:
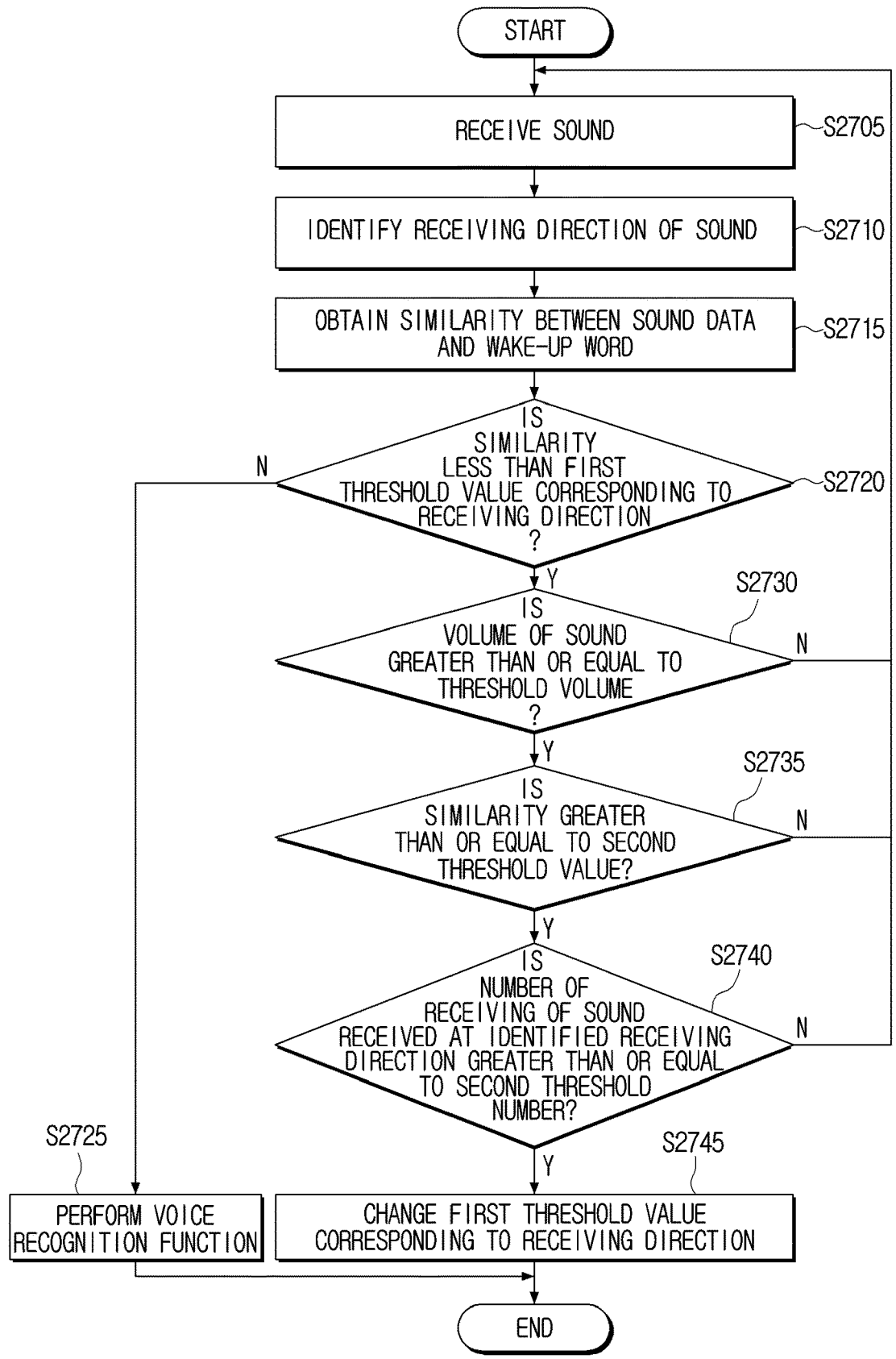
FIG. 27 is a flowchart illustrating an example operation of changing a first threshold value based on sound volume, similarity, and sound reception frequency according to various embodiments.

FIG. 27 is a flowchart illustrating an example operation of changing a first threshold value based on sound volume, similarity, and sound reception frequency according to various embodiments.

Referring to FIG. 27, operations S2705, S2710, S2715, S2725, and S2745 may correspond to operations S1705, S1710, S1715, S1725, and S1730 of FIG. 17. Therefore, some duplicate description may not be repeated here.

The electronic apparatus 100 may receive the sound in operation S2705, identify the direction of reception of the sound in operation S2710, and obtain the similarity between the sound data and the wake-up word in operation S2715. The electronic apparatus 100 may identify whether the similarity is less than a first threshold value corresponding to the receiving direction in operation S2720. If the similarity is greater than a first threshold value corresponding to the receiving direction in operation S2720-N, the electronic apparatus 100 may perform a voice recognition function in operation S2725.

If the similarity is less than the first threshold value corresponding to the receiving direction in operation S2720-Y, the electronic apparatus 100 may identify whether the volume of the sound is greater than or equal to the second threshold volume in operation S2730. If the volume of the sound is less than the second threshold volume in operation S2730-N, the electronic apparatus 100 may repeatedly receive sound.

If the volume of the sound is greater than or equal to the second threshold volume in operation S2730-Y, the electronic apparatus 100 may identify whether the similarity is greater than or equal to the second threshold in operation S2735. If the similarity is less than the second threshold value in operation S2735-N, the electronic apparatus 100 may repeatedly receive sound.

If the similarity is greater than or equal to the second threshold value in operation S2735-Y, the electronic apparatus 100 may identify whether the number of reception of the sound received in the identified receiving direction is greater than or equal to the second threshold number in operation S2740. If the number of times of reception is less than the second threshold number in operation S2740-N, the electronic apparatus 100 may repeatedly receive sound.

If the number of times of reception is equal to or greater than the second threshold number in operation S2740-Y, the electronic apparatus 100 may change the first threshold value corresponding to the receiving direction in operation S2745.

Figure 28:
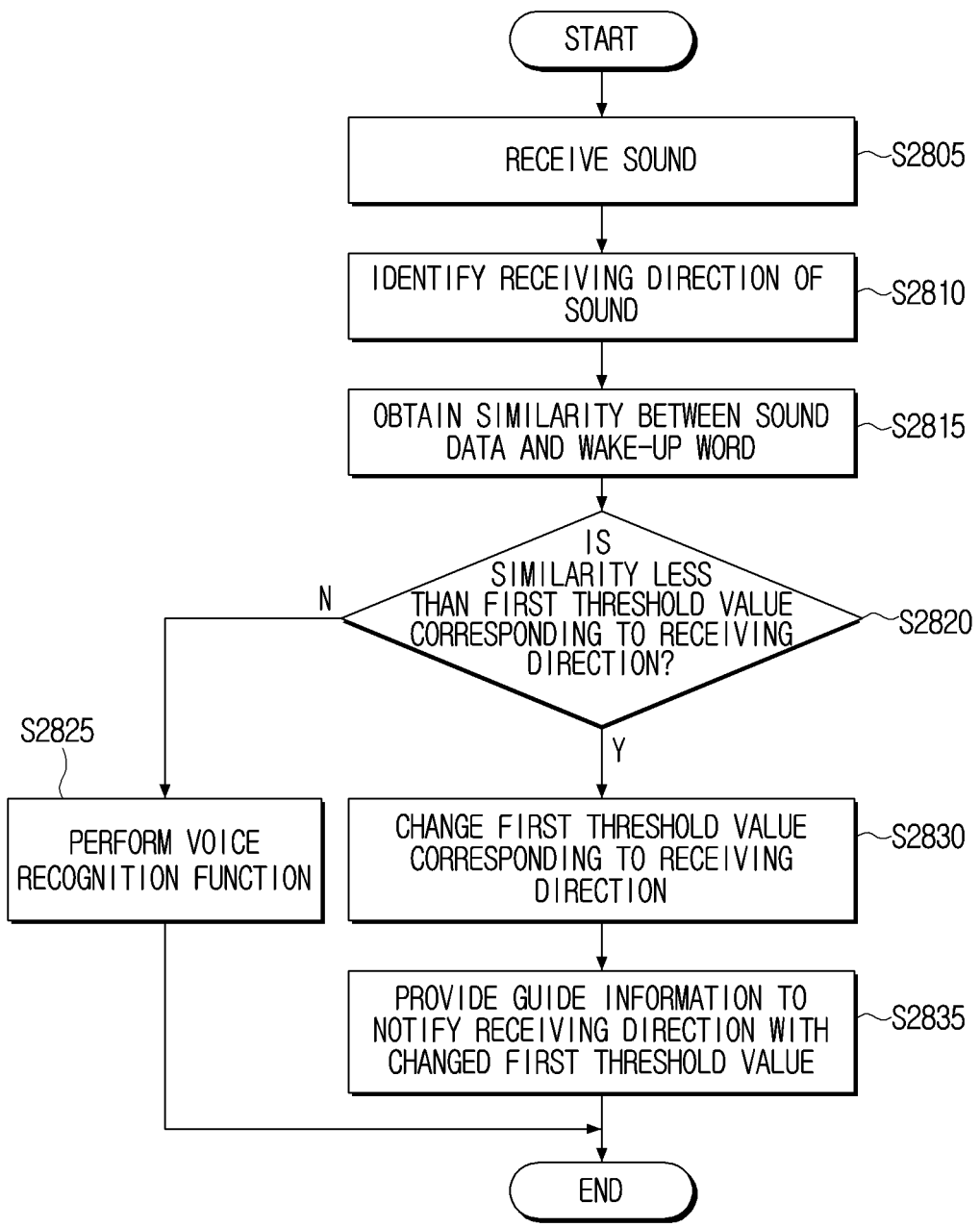
FIG. 28 is a flowchart illustrating an example operation of providing guide information according to various embodiments.

FIG. 28 is a flowchart illustrating an example operation of providing guide information according to various embodiments.

Referring to FIG. 28, operations S2805, S2810, S2815, S2820, S2825, and S2830 may correspond to operations S1705, S1710, S1715, S1725, and S1730 of FIG. 17. Therefore, some duplicate description may not be repeated here.

The electronic apparatus 100 may receive the sound in operation S2805, identify the direction of reception of the sound in operation S2810, and obtain the similarity between the sound data and the wake-up word in operation S2815. The electronic apparatus 100 may identify whether the similarity is less than a first threshold value corresponding to the receiving direction in operation S2820. If the similarity is greater than a first threshold value corresponding to the receiving direction in operation S2820-N, the electronic apparatus 100 may perform a voice recognition function in operation S2825. If the similarity is less than the first threshold value corresponding to the receiving direction in operation S2820-Y, the electronic apparatus 100 may change the first threshold value corresponding to the receiving direction in operation S2830.

The electronic apparatus 100 may provide guide information for informing the receiving direction in which the first threshold value is changed in operation S2835. According to an embodiment, the electronic apparatus 100 may provide guide information to a user through the electronic apparatus 100. According to an embodiment, the electronic apparatus 100 may transmit guide information to an external device and provide guide information to a user through an external device. Here, the contents associated with the guide information will be described in greater detail below with reference to FIGS. 29-32.

FIG. 29 is a diagram illustrating an example operation of providing guide information according to various embodiments.

Referring to FIG. 29, the electronic apparatus 100 may generate a screen 2900 including guide information. The screen 2900 may include at least one of a UI 2910 that includes information for notifying that the wake-up word has not been recognized, a UI 2920 that includes information that the noise is detected, a UI 2930 that includes information for requesting the removal of the noise source to improve the recognition rate of the wake-up word, or a UI 2940 that includes information indicative of the direction of receiving the noise among the plurality of directions.

The UI 2940 may include icons 2941, 2942, and 2943 indicating the direction in which noise is sensed (or identified). For example, it is assumed that the noise source is sensed in the fourth receiving direction r4, the fifth receiving direction r5, and the nth receiving direction rn. The electronic apparatus 100 may generate the UI 2940 including the icon 2941 corresponding to the fourth receiving direction r4, the icon 2942 corresponding to the fifth receiving direction r5, and the icon 2943 corresponding to the nth receiving direction rn.

FIG. 30 is a diagram illustrating an example operation of providing guide information according to various embodiments.

Referring to FIG. 30, it is assumed that the electronic apparatus 100 is divided into a plurality of receiving directions based on 180 degrees, as in the embodiment of FIG. 7. The electronic apparatus 100 may generate a screen 3000 including guide information. The screen 3000 may include an icon 3001 indicating the estimated location of the noise source. The electronic apparatus 100 may identify the estimated location of the noise source based on the identified receiving direction. The electronic apparatus 100 may provide the user with the estimated location of the identified noise source.

FIG. 31 is a diagram illustrating an example operation of providing guide information according to an embodiment.

Referring to FIG. 31, the electronic apparatus 100 may generate the screen 3100 including guide information. The screen 3100 may include at least one of a UI 3110 that includes information for notifying that the wake-up word has not been recognized, a UI 3120 that includes information that the noise is detected, a UI 3130 that includes information requesting noise source removal to improve the recognition rate of the wake-up word, or a UI 3140 that includes the estimated location of the noise source.

The electronic apparatus 100 may identify the estimated location of the noise source based on the identified receiving direction. The electronic apparatus 100 may generate a UI 3140 including icons 3141, 3142, and 3143 indicating a position based on the estimated location of the noise source. The icons 3141, 3142, and 3143 may correspond to the estimated location of the noise source.

FIG. 32 is a diagram illustrating an example operation of providing guide information according to various embodiments.

Referring to FIG. 32, the electronic apparatus 100 may generate a screen 3200 including guide information. The screen 3200 may include at least one of a UI 3210 that includes information for notifying that the wake-up word has not been recognized, a UI 3220 that includes information that the noise is detected, a UI 3230 that includes information for requesting the removal of the noise source to improve the recognition rate of the wake-up word, or a UI 3240 that includes the recommendation location of the electronic apparatus 100.

The UI 3240 may include an icon 3241 indicating a recommended location suitable for placement of the electronic apparatus 100. The electronic apparatus 100 may identify the estimated location of the noise source based on the identified receiving direction. The electronic apparatus 100 may identify a recommended location of the electronic apparatus 100 least affected by the noise source based on the estimated location of the identified noise source. The electronic apparatus 100 may generate a UI 3240 including an icon 3241 corresponding to the identified recommended location.

According to an embodiment, the estimated location of the noise source and the recommended position of the electronic apparatus 100 may be displayed together with one screen 3200.

Figure 33:
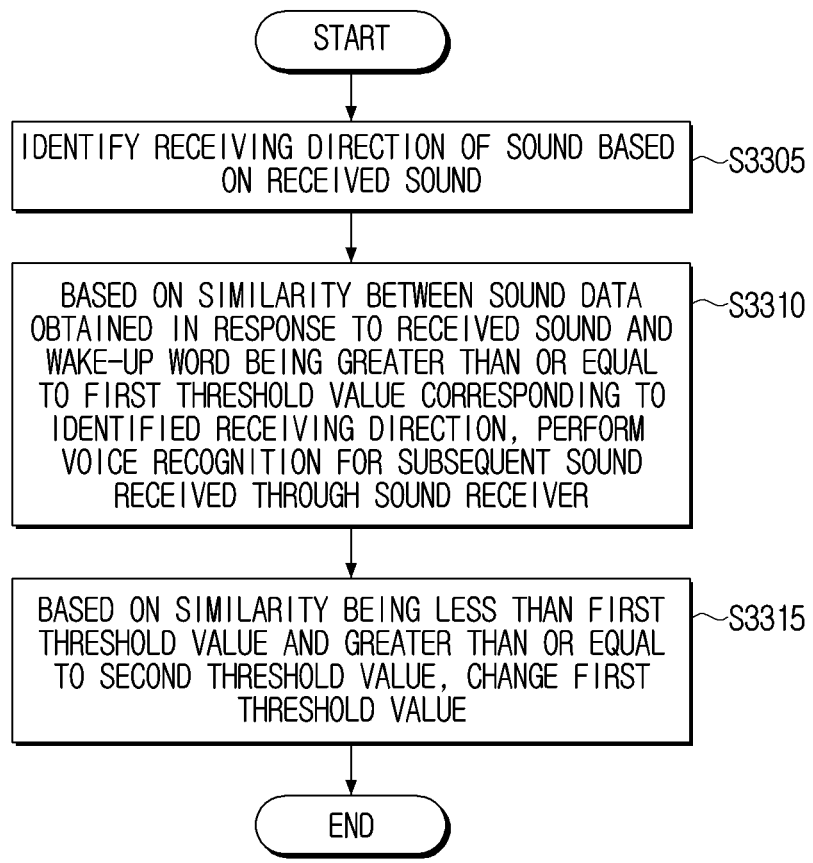
FIG. 33 is a flowchart illustrating an example method of controlling an electronic apparatus according to various embodiments.

FIG. 33 is a flowchart illustrating an example method of controlling the electronic apparatus 100 according to various embodiments.

Referring to FIG. 33, a method of controlling an electronic apparatus for storing a first threshold value and a second threshold value corresponding to a receiving direction of a wake-up word according to an embodiment may include identifying a receiving direction of sound based on a received sound in operation S3305, based on a similarity between sound data obtained in response to the received sound and the wake-up word being greater than or equal to the first threshold value corresponding to the identified receiving direction, performing voice recognition for a subsequent sound in operation S3310 and based on the similarity being less than the first threshold value and greater than or equal to the second threshold value, changing the first threshold value in operation S3315.

The changing the first threshold value in operation S3315 may include, based on a number of reception of the sound having the similarity being less than the first threshold value and greater than or equal to the second threshold value being greater than or equal to a threshold number, changing the first threshold value.

The changing the first threshold value in operation S3315 may include, based on the similarity being less than the first threshold value and greater than or equal to the second threshold value, changing so that the first threshold value increases by a preset or specified ratio.

The electronic apparatus may store a first threshold value and a second threshold value corresponding to each of a first receiving direction and a second receiving direction, and the changing the first threshold value in operation S3315 may include, based on the identified receiving direction being the first receiving direction, changing a first threshold value corresponding to the first receiving direction and maintaining a first threshold value corresponding to the second receiving direction.

The method may further include, based on the received sound including voice data, identifying the receiving direction of the sound and obtaining a similarity between the received sound and the wake-up word.

The first threshold value may be a similarity to identify whether the sound is the wake-up word, and the second threshold value may be a similarity to identify whether the sound is a particular noise source.

The method may further include, based on sound not being received in the identified receiving direction for a threshold time or more, restoring the changed first threshold value to the first threshold value before changing.

The method may include, based on the similarity being less than the first threshold value and greater than or equal to the second threshold value, providing guide information for wake-up recognition, and the guide information may include at least one of information indicating that the wake-up word has not been recognized, information of detecting a noise source, information for requesting removal of the noise source, recommendation location information of the electronic apparatus, or information requesting to change the location of the electronic apparatus.

The providing the guide information may include, based on the number of reception of the sound having the similarity being less than the first threshold value and greater than or equal to the second threshold value being greater than or equal to the first threshold time, providing the guide information, and the changing the first threshold value in operation S3315 may include, based on the number of reception being less than the first threshold time and greater than or equal to the second threshold time, changing the first threshold value.

The identifying the receiving direction of the sound in operation S3305 may include identifying a receiving direction of the sound based on a phase difference of the sound received by the at least two microphones.

The method for controlling the electronic apparatus shown in FIG. 33 may, for example, and without limitation, be performed on an electronic apparatus having the configuration of FIG. 4 or FIG. 5, and may be executed on an electronic apparatus having other configurations.

Meanwhile, the methods according to various embodiments of the disclosure described above may be implemented in an application form that may be installed in an existing electronic apparatus.

The methods according to the various embodiments as described above may be implemented as software upgrade or hardware upgrade for a related-art electronic apparatus.

The various embodiments described above may be performed through an embedded server provided in an electronic apparatus or an external server of at least one electronic apparatus and a display device.

According to an embodiment, the various embodiments described above may be implemented as software including instructions stored in a machine-readable storage media which is readable by a machine (e.g., a computer). The device may include the electronic apparatus according to the disclosed embodiments, as a device which calls the stored instructions from the storage media and which is operable according to the called instructions. When the instructions are executed by a processor, the processor may perform functions corresponding to the instructions using other components or the functions may be performed under a control of the processor. The instructions may include code generated by a compiler or a code executed by an interpreter. The machine-readable storage media may be provided in a form of a non-transitory storage media. The 'non-transitory' storage media may not include a signal and is tangible, but does not distinguish whether data is stored semi-permanently or temporarily in the storage media.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Further, each of the components (e.g., modules or programs) according to the various embodiments described above may be include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. In other words, the disclosure is not limited to the specific embodiments described above. It will be further understood by those skilled in the art that various changes in form and detail may be made without departing from the true spirit and full scope of the disclosure, including the appended claims and their equivalents.

What is claimed is:

1. An electronic apparatus comprising:
a memory for storing a first threshold value and a second threshold value corresponding to a receiving direction of a wake-up word, the first threshold value and the second threshold value corresponding to each of a first receiving direction and a second receiving direction;
a sound receiver comprising sound receiving circuitry; and
a processor configured to:
identify a receiving direction of a sound based on a sound received through the sound receiver,
based on a similarity between sound data obtained in response to the received sound and the wake-up word being greater than or equal to the first threshold value corresponding to the identified receiving direction, perform voice recognition for a subsequent sound received through the sound receiver, and
based on the similarity being less than the first threshold value and greater than or equal to the second threshold value, change the first threshold value to increase by a specified ratio,
based on the identified receiving direction being the first receiving direction, change the first threshold value corresponding to the first receiving direction and maintain the first threshold value corresponding to the second receiving direction,
wherein the first threshold value is a similarity to identify whether the sound is the wake-up word, and
wherein the second threshold value is a similarity to identify whether the sound is a particular noise source.

2. The electronic apparatus of claim 1, wherein the processor is further configured to, based on a number of reception of the sound having the similarity being less than the first threshold value and greater than or equal to the second threshold value greater than or equal to a threshold number, change the first threshold value.

3. The electronic apparatus of claim 1, wherein the processor is further configured to, based on the received sound including voice data, identify the receiving direction of the sound and obtain a similarity between the received sound and the wake-up word.

4. The electronic apparatus of claim 1, wherein the processor is further configured to, based on sound not being received in the identified receiving direction for a threshold time or more, restore the changed first threshold value to the first threshold value.

5. The electronic apparatus of claim 1, wherein the processor is further configured to, based on the similarity being less than the first threshold value and greater than or equal to the second threshold value, provide guide information for wake-up recognition, and
wherein the guide information comprises at least one of information indicating that the wake-up word has not been recognized, information of detecting a noise source, information for requesting removal of the noise source, recommendation location information of the electronic apparatus, or information requesting to change the location of the electronic apparatus.

6. The electronic apparatus of claim 5, wherein the processor is further configured to, based on the number of reception of the sound having the similarity being less than the first threshold value and greater than or equal to the second threshold value greater than or equal to the first threshold time, provide the guide information, and
wherein, based on the number of reception being less than the first threshold time and greater than or equal to the second threshold time, change the first threshold value.

7. The electronic apparatus of claim 1, wherein the sound receiver comprises at least two microphones, and
wherein the processor is further configured to identify a receiving direction of the sound based on a phase difference of the sound received by the at least two microphones.

8. A method of controlling an electronic apparatus storing a first threshold value and a second threshold value corresponding to a receiving direction of a wake-up word, the method comprising:
identifying a receiving direction of a sound based on a sound received through the sound receiver;
based on a similarity between sound data obtained in response to a received sound and the wake-up word being greater than or equal to the first threshold value corresponding to the identified receiving direction, performing voice recognition for a subsequent sound; and
based on the similarity being less than the first threshold value and greater than or equal to the second threshold value, changing the first threshold value,
wherein the changing the first threshold value comprises, based on the similarity being less than the first threshold value and greater than or equal to the second threshold value, changing the first threshold value to increase by a specified ratio,
wherein the first threshold value and a second threshold value respectively correspond to a first receiving direction and a second receiving direction,
wherein the changing the first threshold value comprises, based on the identified receiving direction being the first receiving direction, changing a first threshold value corresponding to the first receiving direction and maintaining a first threshold value corresponding to the second receiving direction,
wherein the first threshold value is a similarity to identify whether the sound is the wake-up word, and
wherein the second threshold value is a similarity to identify whether the sound is a particular noise source.

9. The method of claim 8, wherein the changing the first threshold value comprises, based on a number of reception of the sound having the similarity being less than the first threshold value and greater than or equal to the second threshold value greater than or equal to a threshold number, changing the first threshold value.

10. The method of claim 8, wherein the method further comprises:
based on the received sound including voice data, identifying the receiving direction of the sound and obtaining a similarity between the received sound and the wake-up word.

11. The method of claim 8, wherein the method further comprises:
based on sound not being received in the identified receiving direction for a threshold time or more, restoring the changed first threshold value to the first threshold value.

12. The method of claim 8, wherein the method further comprises:
based on the similarity being less than the first threshold value and greater than or equal to the second threshold value, providing guide information for wake-up recognition, and
wherein the guide information comprises at least one of information indicating that the wake-up word has not been recognized, information of detecting a noise source, information for requesting removal of the noise source, recommendation location information of the electronic apparatus, or information requesting to change the location of the electronic apparatus.

13. The electronic apparatus of claim 12, wherein the providing guide information comprises, based on the number of reception of the sound having the similarity being less than the first threshold value and greater than or equal to the second threshold value greater than or equal to the first threshold time, providing the guide information, and
wherein, based on the number of reception being less than the first threshold time and greater than or equal to the second threshold time, change the first threshold value.

14. The method of claim 8, wherein the identifying the receiving direction of the sound comprises, identifying the receiving direction of the sound based on a phase difference of the sound received by at least two microphones.

* * * * *